(12) United States Patent
De Kievit et al.

(10) Patent No.: US 12,075,244 B2
(45) Date of Patent: Aug. 27, 2024

(54) METHOD FOR SYNCHRONIZATION OF HOME NETWORK KEY

(71) Applicant: NEC Corporation, Tokyo (JP)

(72) Inventors: Sander De Kievit, Tokyo (JP); Kundan Tiwari, Tokyo (JP)

(73) Assignee: NEC CORPORATION, Tokyo (JP)

( * ) Notice: Subject to any disclaimer, the term of this patent is extended or adjusted under 35 U.S.C. 154(b) by 474 days.

(21) Appl. No.: 17/434,505

(22) PCT Filed: Feb. 28, 2020

(86) PCT No.: PCT/JP2020/008314
§ 371 (c)(1),
(2) Date: Aug. 27, 2021

(87) PCT Pub. No.: WO2020/179665
PCT Pub. Date: Sep. 10, 2020

(65) Prior Publication Data
US 2022/0141661 A1    May 5, 2022

(30) Foreign Application Priority Data
Mar. 1, 2019    (IN) .............................. 201911008144

(51) Int. Cl.
*H04W 12/069*    (2021.01)
*H04W 12/041*    (2021.01)
(52) U.S. Cl.
CPC ....... *H04W 12/069* (2021.01); *H04W 12/041* (2021.01)

(58) Field of Classification Search
CPC .......................... H04W 12/069; H04W 12/041
See application file for complete search history.

(56) References Cited

U.S. PATENT DOCUMENTS

2017/0265069 A1    9/2017    Palanigounder et al.

FOREIGN PATENT DOCUMENTS

| WO | 2017/155704 A1 | 9/2017 | |
| WO | WO-2018208949 A1 * | 11/2018 | ......... H04L 63/0892 |

OTHER PUBLICATIONS

Extended European Search Report for EP Application No. 20766456.6 dated on Mar. 11, 2022.
Qualcomm Incorporated, pCR: Reusing KAUSF for AKMA, 3GPP Draft, 3GPP TSG SA WG3 (Security) Meeting #94, S3-190385, Jan. 28-Feb. 1, 2019.
Study on authentication and key management for applications; based on 3GPP credential in 5G (Release 16), 3GPP TR 33.835, V0.3.0, Feb. 12, 2019.
International Search Report for PCT Application No. PCT/JP2020/008314, mailed on Jun. 9, 2020.

(Continued)

*Primary Examiner* — Kevin Kim

(57) ABSTRACT

The present disclosure provides a terminal including a memory; and a processor, comprising hardware, configured to perform a primary authentication between the terminal and a network in 5G for a third party service, derive a security key, $K_{AUSF}$, and derive an identifier for the security key from the security key.

15 Claims, 14 Drawing Sheets

(56) References Cited

OTHER PUBLICATIONS

3rd Generation Partnership Project, "Technical Specification Group Services and System Aspects; Security architecture and procedures for 5G system (Release 15)", 3GPP TS 33.501 V15.3.1, Dec. 2018, pp. 1-182.

European Telecommunications Standards Institute, "Technical Specification; 5G; Security architecture and procedures for 5G System", ETSI TS 133 501 V15.1.0, Jul. 2018 (3GPP TS 33.501 version 15.1.0 Release 15), pp. 1-150.

JP Official Communication for JP Application No. 2023-061811, mailed on Feb. 6, 2024 with English Translation.

NEC, "Discussion on use of established keys for AKMA root key", 3GPP TSG SA WG3 #94AH S3-190640, Mar. 4, 2019.

* cited by examiner

METHOD FOR SYNCHRONIZATION OF HOME NETWORK KEY

This application is a National Stage Entry of PCT/JP2020/008314 filed on Feb. 28, 2020, which claims priority from Indian Patent Application 201911008144 filed on Mar. 1, 2019, the contents of all of which are incorporated herein by reference, in their entirety.

TECHNICAL FIELD

The present disclosure relates to a method for a mobile terminal and a home network to identify a key and to keep the key synchronized between the home network and the mobile terminal, wherein the key is derived for each authentication session between the terminal and the home network.

BACKGROUND ART

In order to authenticate a user equipment (UE) and network in 5G and to start using agreed keys, two separate procedures are necessary. The first procedure is the authentication and key agreement. During this procedure, the UE and network authenticate each other mutually and can derive some of the keys higher up in the key hierarchy, such as CK and IK, CK' and IK', $K_{AUSF}$, $K_{SEAF}$, and $K_{AMF}$. The completion of such a procedure leads to a non-current (partial) security context in both the UE and the network.

The second procedure is the NAS SMC (Non Access Stratum Secure Mode Command) procedure during which the network informs the UE that it would like to take the keys resulting from the latest authentication into use. As a result of this procedure, the non-current security context becomes the current security context and the old security context is removed from memory.

CITATION LIST

Non Patent Literature

NPL 1: 3GPP (3rd Generation Partnership Project) TS33.501 V15.3.1

SUMMARY OF INVENTION

Technical Problem

In NPL1, however, the keys that can be part of a (non-current) security context are the keys $K_{AMF}$ and lower in the key hierarchy. As such, the $K_{SEAF}$ and the $K_{AUSF}$ are never part of a security context. The status of $K_{SEAF}$ and $K_{AUSF}$ is therefore undefined, meaning that it is unclear whether they have been taken into use or not. Furthermore, the network elements handling the $K_{SEAF}$ and the $K_{AUSF}$ (the SEAF and AUSF respectively) are not informed of a successful NAS SMC procedure and therefore do not know whether the key is active or not. On the contrary, the UE takes part in the NAS SMC procedure and therefore knows when the non-current security context becomes the current security context. As a further complication, the Authentication Server Function (AUSF) resides in the home network whereas the Access and Mobility Management Function (AMF) or the Security Anchor Function (SEAF) resides in the serving network so that even if the serving network knows when a security context is made the current one, the AUSF has no means to be informed.

The situation is displayed in FIG. 1. FIG. 1 illustrates an issue that exists with only one AKA and one NAS SMC, according to a reference disclosed in NPL1. Initially, the UE, AMF, SEAF and AUSF have no keys relating to the UE. After authentication and key agreement has been completed, the UE, AMF, SEAF and AUSF all have keys resulting from the last Authentication and Key Agreement (AKA). At this point in time, however, none of these keys is used actively by the network or the UE, which is indicated with the primes. If subsequently, the AMF runs the NAS SMC, the UE and the AMF take the keys into use. However, for the SEAF and AUSF, the primes on the keys remain because they are uninformed of whether the keys are taken into use.

In addition to this problem, the following problems also can occur:

When using 5G AKA, the AUSF will store the $K_{AUSF}$ already before the authentication and key agreement has been successfully completed. As such, any serving network that has access to the subscription unique permanent identifier (SUPI) of the UE can effectively overwrite the key in the AUSF by simply triggering an authentication.

When using Extensible Authentication Protocol (EAP) AKA', the UE will create a temporary security context consisting of $K_{AUSF}$, $K_{SEAF}$, and $K_{AMF}$, and remove it if no EAP Success message is received. A serving network can overwrite the $K_{AUSF}$ in the AUSF by almost completing the authentication, but never sending the EAP Success message to the UE.

This poses a further set of problems:

For the AUSF and SEAF: if one of the $K_{SEAF}$ or $K_{AUSF}$ is used in subsequent procedures, the SEAF and AUSF cannot be certain that the UE has taken the same key into use.

For the UE: if one of the procedures use $K_{SEAF}$ or $K_{AUSF}$ and the UE has more than one security context, the UE does not know which key has been used.

The serving network can overwrite the $K_{AUSF}$ in the AUSF which effectively renders any service relying on the presence of this key void.

In FIG. 2, the key hierarchy as defined in NPL1 is displayed. FIG. 2 illustrates a key hierarchy as defined in NPL1. As a result of an authentication and key agreement, this key hierarchy is established in the UE and the different network elements indicated in the figure. In 5G, there are two authentication protocols, namely 5G AKA and EAP AKA', which is indicated with dashed boxes.

From these keys, the following keys and parameters are part of the following security contexts:

5G Security context: 5G NAS Security Context, and the 5G Access Stratum (AS) Security context for 3GPP access and/or the 5G AS security context for non-3GPP access.

5G AS security context for 3GPP access: $K_{gNB}$, NH (next hop parameter), $K_{RRCint}$, $K_{RRCenc}$, $K_{UPint}$, $K_{UPenc}$, Next Hop Chaining Counter parameter (NCC), identifiers for keys, the UE security capabilities, the UP security policy, and counters used for replay protection.

5G AS security context for non-3GPP access: $K_{N3IWF}$ and the cryptographic keys, cryptographic algorithms and tunnel security parameters associated with the IPsec connection.

Full 5G NAS Security context: $K_{AMF}$, $K_{NASint}$, $K_{NASenc}$, ngKSI (next generation Key Set Identifier), UE security capabilities, uplink and downlink counters.

Partial 5G NAS Security context: $K_{AMF}$, ngKSI, UE security capabilities, uplink and downlink NAS COUNT values set to 0.

FIG. 3 shows the key derivations with the inputs. FIG. 3 illustrates a key hierarchy with key derivation inputs as defined in NPL1.

FIG. 4 illustrates NAS secure mode command procedure in NPL1. In FIG. 4, the NAS SMC procedure is shown, which takes the non-current security context into use.

The FIG. 4 shows that the NAS Secure Mode Command contains the ngKSI and the Anti-Bidding down Between Architectures (ABBA) parameter, which are necessary to identify the $K_{AMF}$ and to derive the $K_{AMF}$ respectively. As can be seen from the FIG. 4, ciphering and integrity protection is started after the reception of the respective messages in the UE and the AMF. As such, the keys are being taken into use during this procedure.

FIG. 5 displays the method for establishing a partial security context when using EAP AKA' according to the state of the art. FIG. 5 illustrates authentication and key agreement procedure for EAP AKA' according to the state of the art.

FIG. 5 includes following steps.

1. The UE sends a registration request message to the SEAF in the mobile network. The UE includes in the registration request message:
The Subscription Concealed Identifier (SUCI) calculated from the Subscription Permanent Identifier (SUPI) and the home network public key stored in the UE, or:
The 5G temporary identifier that was provided to the UE after a previous authentication and key agreement run by the network.
2. (Optional) The SEAF, upon reception of the registration request or initial NAS message from the UE, will determine whether it knows the temporary identifier. If the temporary identifier is included but it is not known in the SEAF, the SEAF will initiate an identification procedure and send an identity request message to the UE.
3. (Optional) If the UE receives an identity request message, it will respond to the SEAF/AMF with an identity response message containing the SUCI.
4. Upon reception of the identity response message, the SEAF will initiate the authentication by sending an authentication request message to the AUSF including the SUCI and the Serving Network Name. In 5G, this request is called the Nausf_UE_Authentication Authenticate Request.
5. After reception of the authentication request message, the AUSF will send an authentication vector request message indicating a request for an authentication vector to the UDM. The AUSF includes the SUCI and the Serving Network Name in this request. In 5G, this request is called the Nudm_UEAuthentication_Get Request.
6. After reception of the authentication vector request message, the UDM will decide on which authentication method to use (EAP AKA' or 5G AKA), create an authentication vector and send it to the AUSF. The authentication vector will contain RAND, AUTN, XRES, CK' and IK' in case of EAP AKA', and send the authentication vector and the SUPI in the response to the AUSF. In 5G, this message is the Nudm_UEAuthentication_Get Response.
7. When the AUSF receives the authentication vector, it will send the EAP-Request/AKA'-Challenge to the SEAF. This message includes the RAND, AUTN.
8. The SEAF receives the EAP-Request/AKA' Challenge and sends this message to the UE. The SEAF also includes the ngKSI and the ABBA parameter so that the $K_{AMF}$ can be derived by the UE after successful authentication.

In step A, the UE will verify the AUTN, and if successful, use the RES and K stored in the USIM to calculate CK and IK, and from CK and IK, calculate the CK' and IK', $K_{AUSF}$, $K_{SEAF}$ and $K_{AMF}$. The UE will create a temporary security context in which $K_{AUSF}$, $K_{SEAF}$, $K_{AMF}$, ngKSI, and other security context related parameters like counters are stored.

9. The UE will return the RES (response) to the SEAF. In 5G, this message is the Authentication Response message.
10. The SEAF forwards the RES to the AUSF. In 5G, the message that the SEAF will use is the Nausf_UEAuthenticationAuthenticate Request message.

In step B, the AUSF, after receiving the message, will verify the response and if correct, store the $K_{AUSF}$.

11. If the response was successful, the AUSF will send the EAP Success message to the SEAF. The AUSF will also send the $K_{SEAF}$ and the SUPI to the SEAF in the same message.
12. Upon reception of the EAP Success message, the SEAF will calculate the $K_{AMF}$ after reception of the EAP Success message and forward the $K_{AMF}$ and SUPI to the AMF. Also, the SEAF may send the EAP Success message to the UE.

In step C, if the SEAF send the EAP Success message to the UE, the UE will transform the temporary security context to a current security context including $K_{AUSF}$, $K_{SEAF}$ and $K_{AMF}$, and store it for later use. If the EAP Success message was not sent, but the UE receives a NAS SMC at a later point in time, the UE will transform the temporary security context into a current security context.

FIG. 6 displays a method for establishing a partial security context when using 5G AKA according to the state of the art. FIG. 6 illustrates a method for establishing a partial security context when using 5G AKA according to the state of the art.

FIG. 6 includes following steps.

1. The UE sends a registration request message to the SEAF in the mobile network. The UE includes in the registration request message:
The Subscription Concealed Identifier (SUCI) calculated from the Subscription Permanent Identifier (SUPI) and the home network public key stored in the UE, or:
The 5G temporary identifier that was provided to the UE after a previous authentication and key agreement run by the network.
2. (Optional) The SEAF, upon reception of the registration request or initial NAS message from the UE, will determine whether it knows the temporary identifier. If the temporary identifier is included but it is not known in the SEAF, the SEAF will initiate an identification procedure and send an identity request message to the UE.
3. (Optional) If the UE receives an identity request message, it will respond to the SEAF/AMF with an identity response containing the SUCI.
4. Upon reception of the identity response message, the SEAF will initiate the authentication by sending an authentication request message to the AUSF including the SUCI and the Serving Network Name. In 5G, this request is called the Nausf_UE_Authentication Authenticate Request.
5. After reception of the authentication request message, the AUSF will send an authentication vector request message indicating a request for an authentication vector to the UDM. The AUSF includes the SUCI and the Serving Network Name in this request. In 5G, this request is called the Nudm_UEAuthentication_Get Request.

6. After reception of the authentication vector request message, the UDM will decide on which authentication method to use (EAP AKA' or 5G AKA), create an authentication vector and send it to the AUSF. The authentication vector will contain RAND, AUTN, XRES*, $K_{AUSF}$ in case of 5G AKA', where XRES* is calculated from the XRES, the serving network name, and the RAND using a cryptographic hash function, and send the authentication vector and the SUPI in the response to the AUSF. In 5G, this message is the Nudm_UEAuthentication_Get Response.

In step B, after receiving the authentication vector, the AUSF will store or overwrite the $K_{AUSF}$ according to the state of the art.

7. After receiving the authentication vector, the AUSF will generate a new authentication vector by computing the HXRES* from XRES* and $K_{SEAF}$ from $K_{AUSF}$. The HXRES* is calculated using a hash and XRES* as one of the inputs. The AUSF sends the HXRES*, $K_{SEAF}$, AUTN, and RES to the SEAF. In 5G, this new authentication vector is returned to the SEAF using the Nausf_UEAuthentication_Authenticate Response.

8. The SEAF receives the authentication vector, extracts RAND and AUTN, and sends these values in a message to the UE. The SEAF also includes the ngKSI and the ABBA parameter so that the $K_{AMF}$ can be derived by the UE after successful authentication. In 5G, this message is called the authentication request.

In step A, the UE will verify the AUTN, and if successful, use the RES and K stored in the USIM to calculate CK and IK, and from CK and IK, calculate the $K_{AUSF}$, $K_{SEAF}$ and $K_{AMF}$. The UE will create a non-current security context in which $K_{AUSF}$, $K_{SEAF}$, $K_{AMF}$ and ngKSI are stored. The UE will also calculate the RES* by using a key derivation function with RES, RAND, CK, IK, and serving network name as an input. The resulting RES* is returned to the SEAF.

9. The UE will return the RES* to the SEAF. In 5G, this message is the Authentication Response message.

10. Upon reception of the RES*, the SEAF calculates HRES* and compare with HXRES*. If the two values match, the SEAF forwards the RES* to the AUSF. In 5G, the message that the SEAF will use is the Nausf_UEAuthenticationAuthenticate Request message.

11. If the response was successful, the AUSF will indicate that the authentication was successful to the SEAF. The AUSF will also send the SUPI and $K_{SEAF}$ to the SEAF in the same message. In 5G, the message Nausf_UEAuthentication_Authenticate Response is used for this message.

12. Upon reception of the success indication, the SEAF will calculate the $K_{AMF}$ after reception of the success message and forward the $K_{AMF}$ and SUPI to the AMF.

In view of the problems described above, the present disclosure aims to provide a solution to solve at least one of the various problems.

Solution to Problem

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter.

Its sole purpose is to present some concepts of the subject matter in a simplified form as a prelude to the more detailed description that is presented later.

In a first aspect of the present disclosure, a terminal is provided, the terminal including a memory, and a processor, comprising hardware, configured to perform a primary authentication between the terminal and a network in 5G for a third party service, derive a security key, $K_{AUSF}$, and derive an identifier for the security key from the security key.

In a second aspect of the present disclosure, a method is provided, the method including performing a primary authentication between the terminal and a network in 5G for a third party service, deriving a security key, $K_{AUSF}$, and deriving an identifier for the security key from the security key.

In a third aspect of the present disclosure, a core network apparatus used in a network in 5G is provided, the core network apparatus including a memory, and a processor, comprising hardware, configured to perform a primary authentication between a terminal and the network for a third party service, derive a security key, $K_{AUSF}$, and derive an identifier for the security key from the security key.

BRIEF DESCRIPTION OF DRAWINGS

The foregoing and further objects, features and advantages of the present subject matter will become apparent from the following description of exemplary embodiments with reference to the accompanying drawings, wherein like numerals are used to represent like elements.

It is to be noted, however, that the appended drawings along with the reference numerals illustrate only typical embodiments of the present subject matter, and are therefore, not to be considered for limiting of its scope, for the subject matter may admit to other equally effective embodiments.

DESCRIPTION OF EMBODIMENTS

Figure 1:
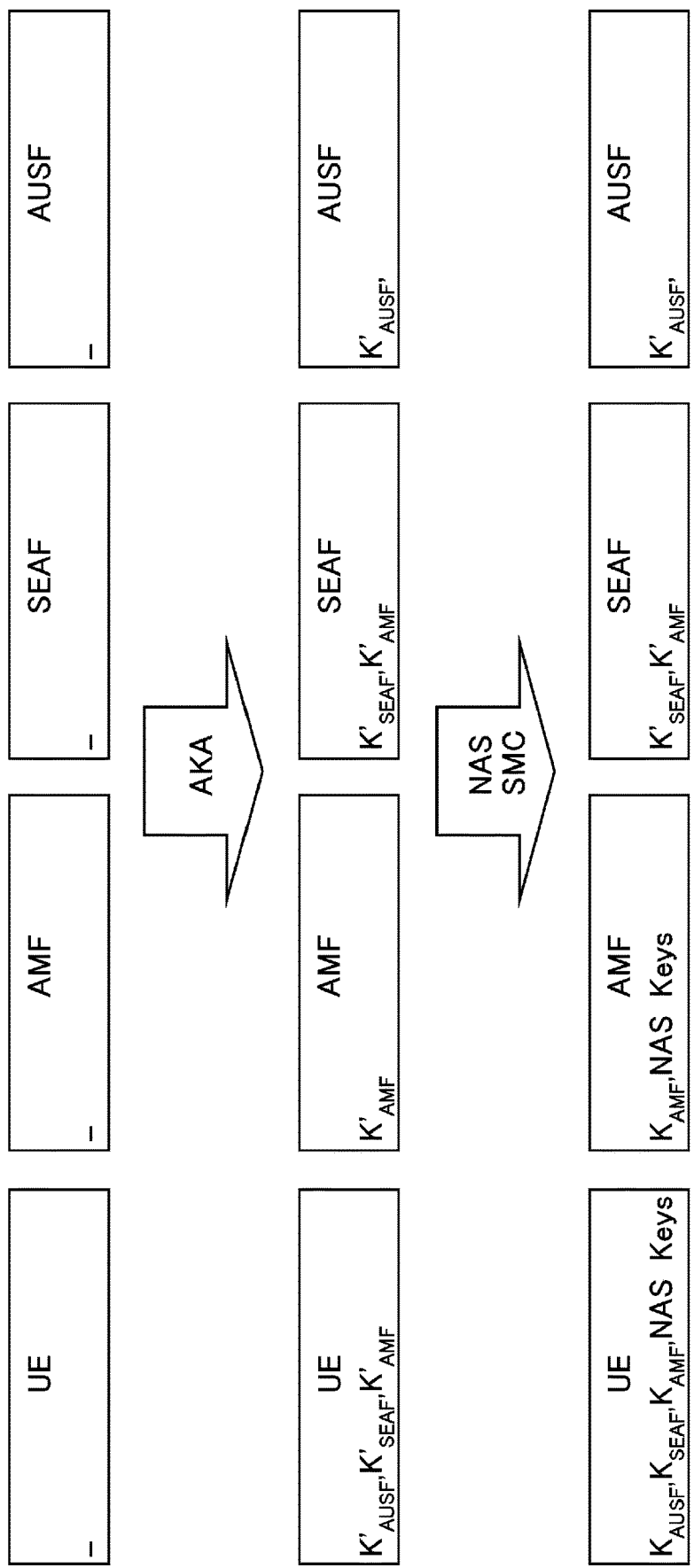
FIG. 1 illustrates an issue that exists with only one AKA and one NAS SMC, according to a reference disclosed in NPL1.
Figure 2:
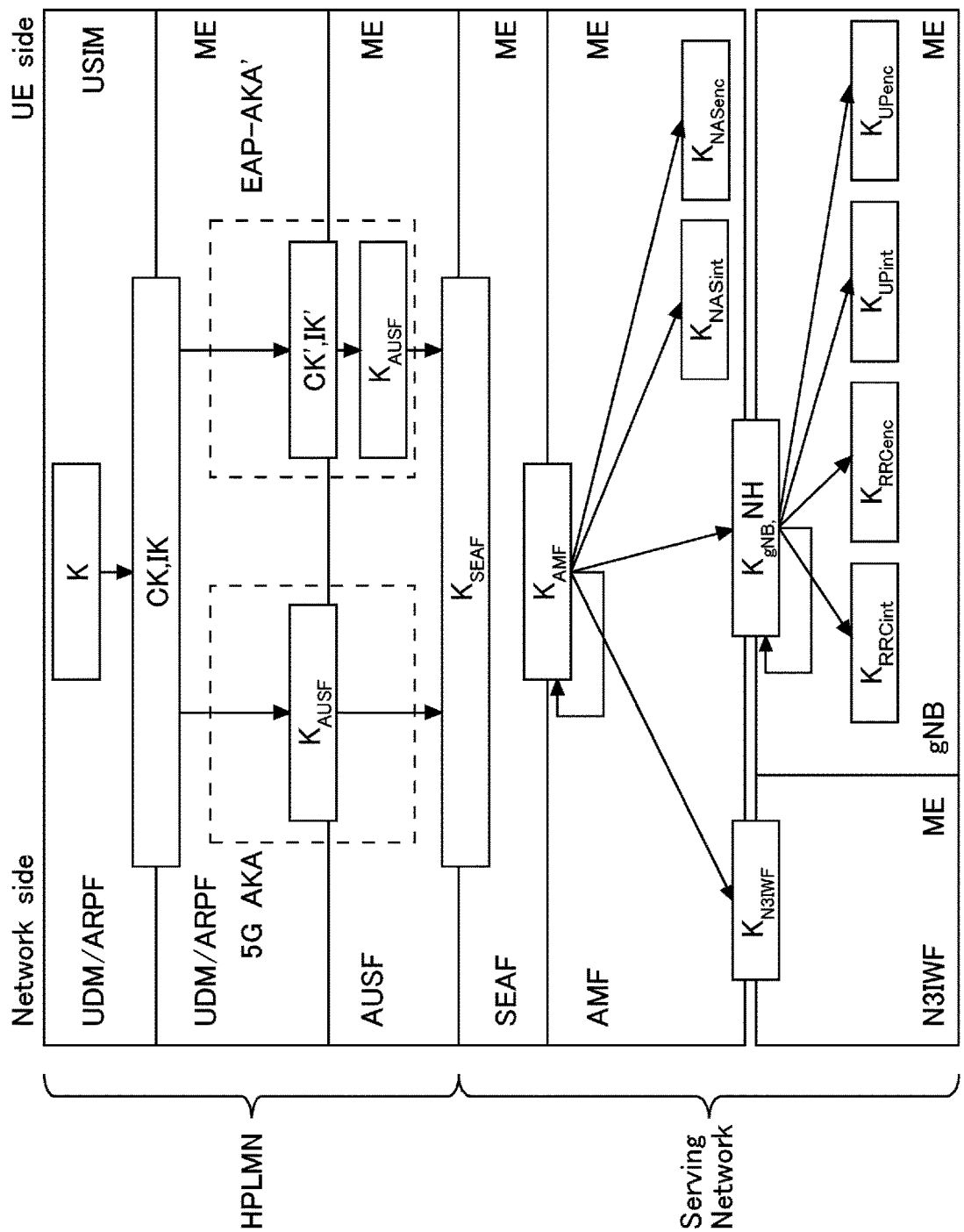
FIG. 2 illustrates a key hierarchy as defined in NPL1.
Figure 3:
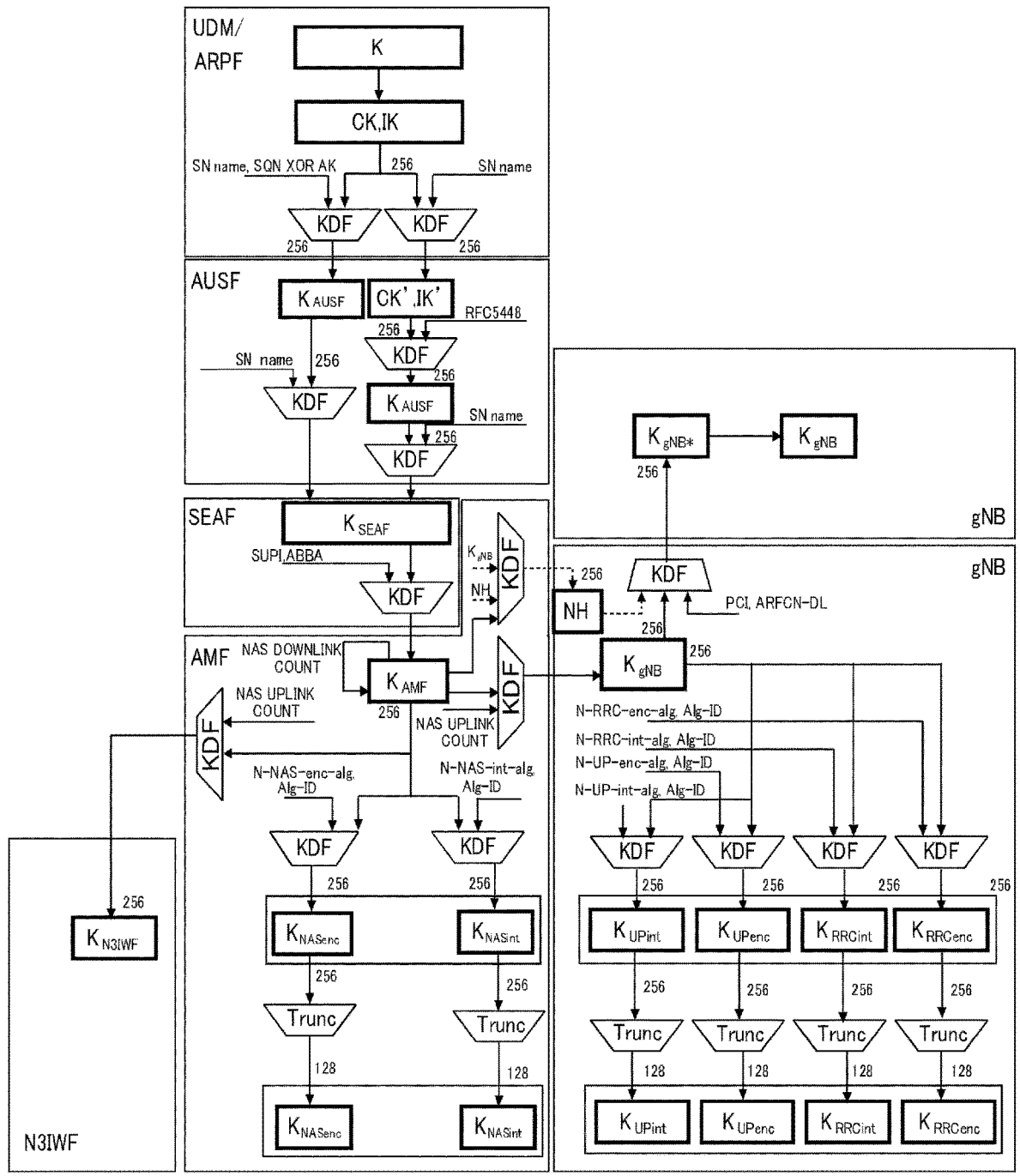
FIG. 3 illustrates a key hierarchy with key derivation inputs as defined in NPL1.
Figure 4:
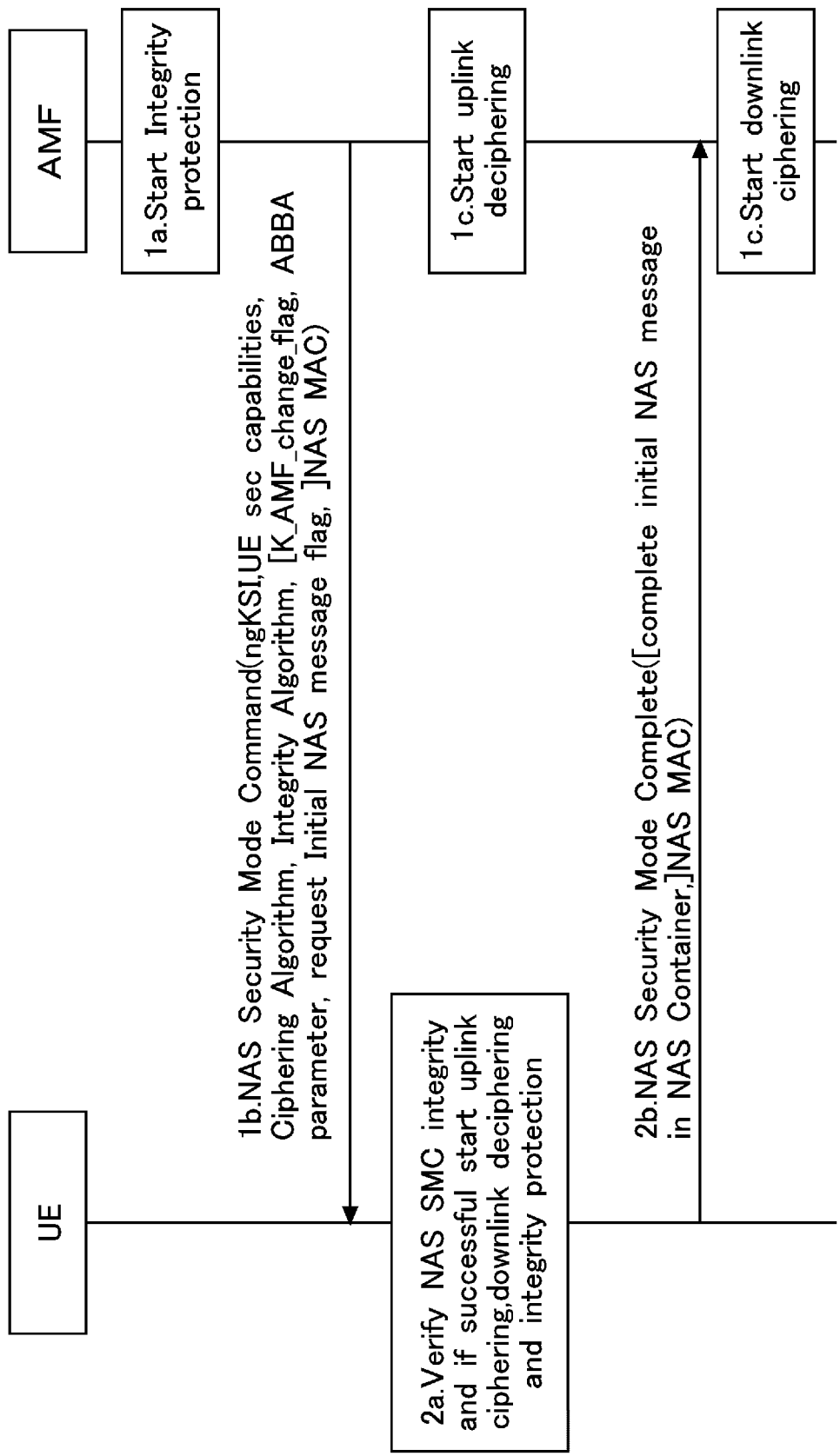
FIG. 4 illustrates NAS secure mode command procedure in NPL1.

According to an embodiment of the present disclosure, a method for synchronization of home network key is disclosed, which comprises: storing $K_{AUSF}$ together with a $K_{AUSF}$ identifier, inside a UE, for the current, the non-current, and the temporary security context; storing the $K_{AUSF}$ together, inside the network, with a $K_{AUSF}$ identifier; and storing, by the AUSF, multiple $K_{AUSF}$'s.

According to an embodiment of the present disclosure, usage of the $K_{AUSF}$ will include the identifier of the $K_{AUSF}$ in their messages such that it is known which $K_{AUSF}$ is used.

According to an embodiment of the present disclosure, based on the usage, keys may be deleted from memory.

Further, according to an embodiment of the present disclosure, the method comprises:
calculating an identifier for $K_{AUSF}$ and $K_{SEAF}$ from the keys themselves at both the UE and the AUSF and/or SEAF; and storing said identifier together with the $K_{AUSF}$ and $K_{SEAF}$.

Yet, in another embodiment of the present disclosure, the method comprises: storing multiple identifiers and keys; and keeping the status for each key that has been derived.

In an embodiment of the present disclosure, there is a set of criterion basis of which it is determined which keys are to be deleted.

In an embodiment of the present disclosure, the serving network causes a synchronization error between the $K_{AUSF}$ in the UE and the one in the AUSF.

In an embodiment of the present disclosure, the $K_{AUSF}$ protects or encrypts information exchange between the AUSF and the UE.

In an embodiment of the present disclosure, the AUSF and SEAF store a key referenced by the UE, such as a key for a specific application or a bootstrapping key that is used in later procedures to derive a further key.

In an embodiment of the present disclosure, a UE is disclosed, wherein the UE includes a transceiver circuit which is operable to transmit signals to and to receive signals from the connected node(s) via one or more antenna.

In an embodiment of the present disclosure, a (R)AN node is disclosed, the (R)AN node includes a transceiver circuit which is operable to transmit signals to and to receive signals from connected UE(s) via one or more antenna and to transmit signals to and to receive signals from other network nodes (either directly or indirectly) via a network interface, a controller that controls the operation of the (R)AN node in accordance with a memory.

In an embodiment of the present disclosure, a core network is disclosed, the core network node includes a transceiver circuit which is operable to transmit signals to and to receive signals from other nodes (including the UE) via a network interface. A controller controls the operation of the core network node in accordance with software stored in a memory.

In an embodiment of the present disclosure, the core network node is at least one of: an AMF, a SMF, a SEAF, an AUSF, an UPF, an UDM, an ARPF, SIDF, a PCF, an AF etc.

These and other objects, embodiments and advantages of the present disclosure will become readily apparent to those skilled in the art from the following detailed description of the embodiments having reference to the attached figures, the disclosure not being limited to any particular embodiments disclosed.

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

It is to be noted, however, that the reference numerals in claims illustrate only typical embodiments of the present subject matter, and are therefore, not to be considered for limiting of its scope, for the subject matter may admit to other equally effective embodiments.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

The central idea of this embodiment of the present application is to calculate an identifier for $K_{AUSF}$ and $K_{SEAF}$ from the keys themselves at both the UE and the AUSF and/or SEAF and store this identifier together with the $K_{AUSF}$ and $K_{SEAF}$.

This embodiment works as follows.

Figure 5:
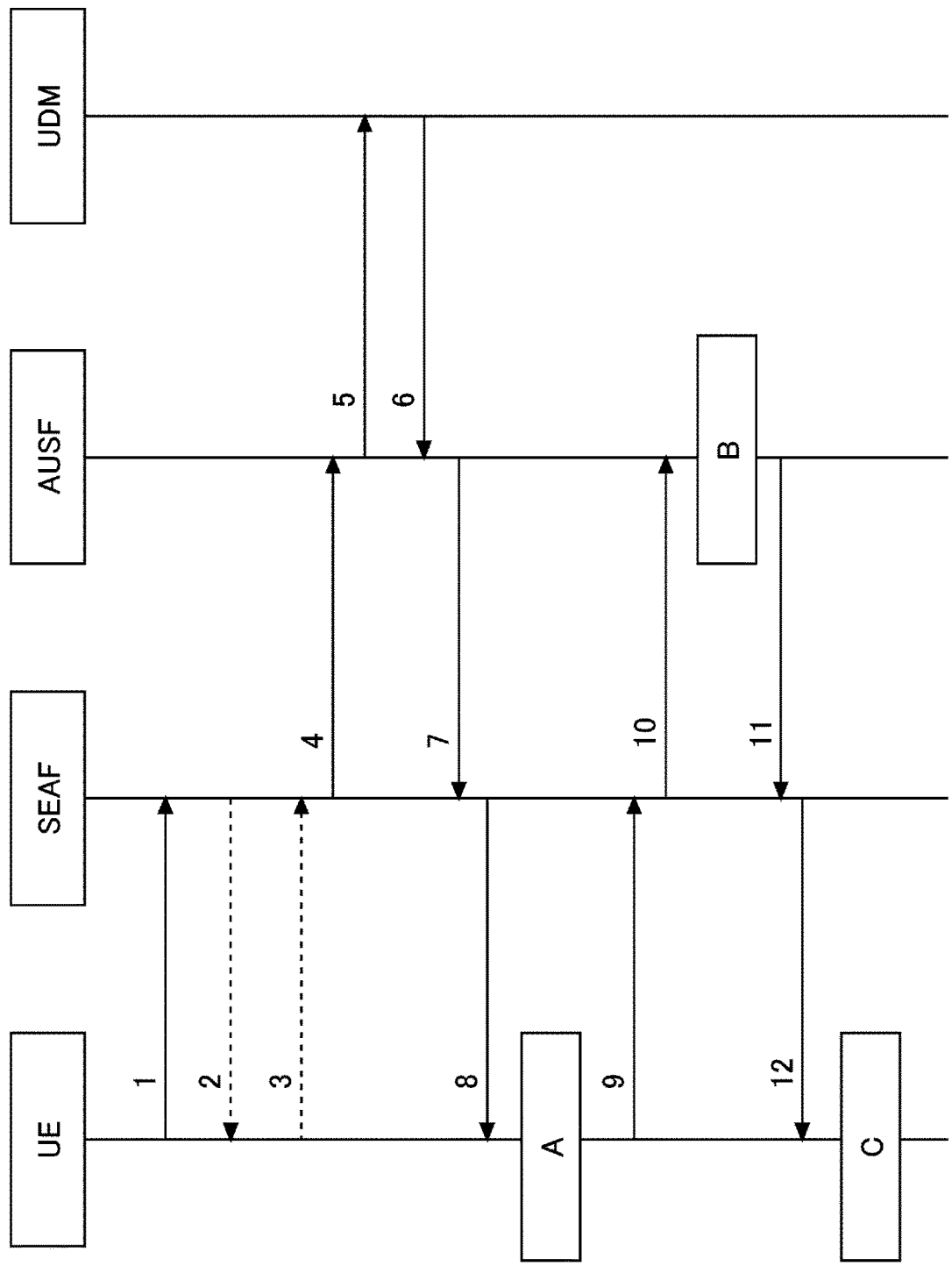
FIG. 5 illustrates authentication and key agreement procedure for EAP AKA' according to the state of the art.

The steps herein refer to FIG. 5. It is assumed that the UE that is being authenticated corresponds to IMSI1. The following steps are performed.

Steps 1-8 are unchanged from FIG. 5 and we refer to the description with FIG. 5. In step A, the UE now performs the following.

In step A, in addition to creating a temporary security context, the UE also creates an identifier for the $K_{AUSF}$ by using a key derivation function as follows:

$$KI_{AUSF}=KDF(K_{AUSF},"KI"), \text{ and}$$

$$KI_{SEAF}=KDF(K_{SEAF},"KI"),$$

Where the KI stands for Key Identifier and the subscript indicates for which key it is used, and the KDF stands for the key derivation function. The "KI" input text is a string, but could also be a number. Additional values, like the RAND, RES, serving network name, etc. could also be included in the key derivation function. The UE stores this pair of KIs and Keys separately. In this storage, the UE may also mark that these keys are the result of an authentication run that was not yet completed. The UE may also store a timestamp of when the key was derived (not shown in table 1). The storage of the keys at this point in time could look as follows:

TABLE 1

| Type of Key | KI | Key | Authentication result? |
|---|---|---|---|
| SEAF | $KI_{SEAF1}$ | $K_{SEAF1}$ | Not completed |
| AUSF | $KI_{AUSF1}$ | $K_{AUSF1}$ | Not completed |

Steps 9 and 10 are unchanged from FIG. 5. In step B, the AUSF performs the following.

In step B, the AUSF starts with creating an identifier for the $K_{AUSF}$ by using a key derivation function as follows:

$$KI_{AUSF}=KDF(K_{AUSF},"KI")$$

Where the KI stands for Key Identifier and the subscript indicates for which key it is used, and the KDF stands for the key derivation function. The "KI" input text is a string, but could also be a number. Additional values, like the RAND, RES, serving network name, etc. could also be included in the key derivation function. The AUSF stores this pair of KIs and Keys together in a storage. In this storage, the AUSF may also mark that these keys have been used or not in subsequent procedures. The AUSF may also store a timestamp of when the key was derived (not shown in table 2). The storage of the keys at this point in time could look as follows:

TABLE 2

| Identity (IMSI) | KI | Key | Used? |
|---|---|---|---|
| IMSI1 | $KI_{AUSF1\_IMSI1}$ | $K_{AUSF1\_IMSI1}$ | No |
| IMSI2 | $KI_{AUSF1\_IMSI2}$ | $K_{AUSF1\_IMSI2}$ | Yes |

Note that the AUSF can also use the SUPI instead of the IMSI as an identifier.

Figure 7:
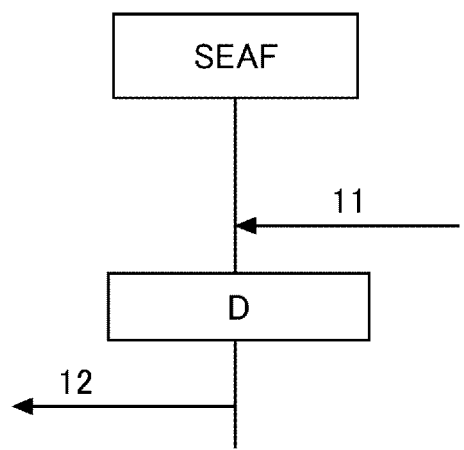
FIG. 7 illustrates a process of SEAF for creating an identifier for the $K_{SEAF}$ in accordance with an embodiment of the present disclosure.

Step 11 is unchanged from FIG. 5. After the reception of the message in step 11, the SEAF may also create a storage of the keys as follows in a new step D as shown in FIG. 7. FIG. 7 illustrates a process of SEAF for creating an identifier for the $K_{SEAF}$ in accordance with an embodiment of the present disclosure.

In step D, the SEAF creates an identifier for the $K_{SEAF}$ by using a key derivation function as follows:

$$KI_{SEAF}=KDF(K_{SEAF},"KI")$$

Where the KI stands for Key Identifier and the subscript indicates for which key it is used, and the KDF stands for the key derivation function. The "KI" input text is a string, but could also be a number. Additional values, like the RAND, RES, serving network name, etc. could also be included in the key derivation function. The SEAF stores this pair of KIs and Keys together in a storage. In this storage, the SEAF may also mark whether it has completed the authentication by sending the EAP Success message to the UE. The SEAF may also store a timestamp of when the key was derived (not shown in table 3). The storage of the keys at this point in time could look as follows:

TABLE 3

| Identity (IMSI) | KI | Key | Auth. Completed? |
|---|---|---|---|
| IMSI1 | $KI_{SEAF1\_IMSI1}$ | $K_{SEAF1\_IMSI1}$ | Yes |
| IMSI2 | $KI_{SEAF1\_IMSI2}$ | $K_{SEAF1\_IMSI2}$ | No |

Note that the SEAF can also set the Authentication Completed field to "No" initially and change it to "Yes" after sending the EAP Success. Instead of the IMSI, the SEAF can also use the SUPI as the UE identifier.

Step 12 is unchanged from FIG. 5. If the SEAF sends an EAP Success message, the UE will take the following action at step C.

In step C, in addition to transforming the temporary security context to a non-current security context, the UE also changes the status of the keys in the storage by changing the authentication result to "completed". For a single authentication run, the storage now looks as follows:

TABLE 4

| Type of Key | KI | Key | Authentication result? |
|---|---|---|---|
| SEAF | $KI_{SEAF1}$ | $K_{SEAF1}$ | Completed |
| AUSF | $KI_{AUSF1}$ | $K_{AUSF1}$ | Completed |

Figure 6:
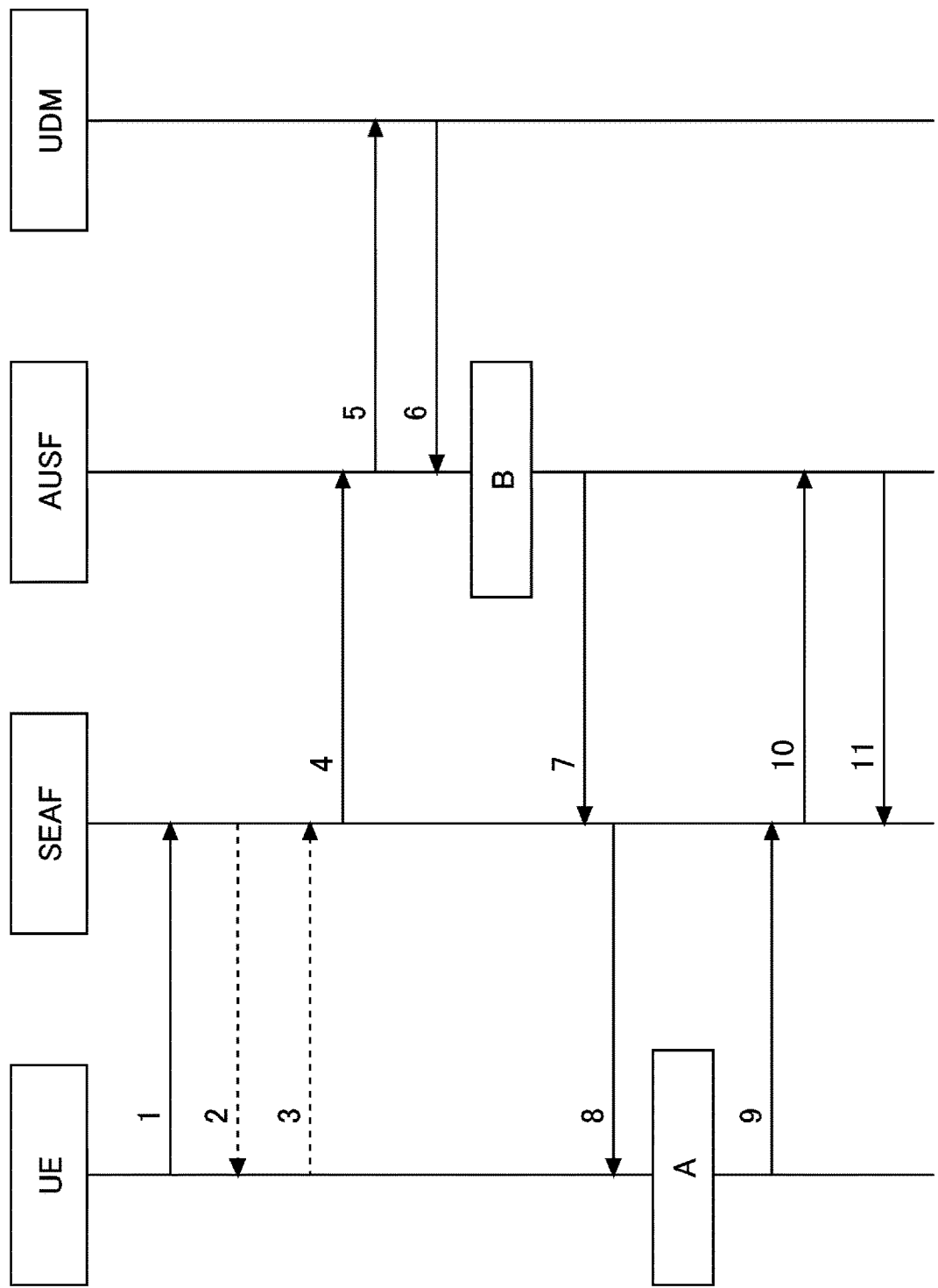
FIG. 6 illustrates a method for establishing a partial security context when using 5G AKA according to the state of the art.

The steps refer to the steps in FIG. 6. It is assumed that the UE that is being authenticated corresponds to IMSI1. The following steps are performed:

Steps 1-6 are unchanged. In step B, the AUSF performs the following.

In step B, the AUSF starts with creating an identifier for the $K_{AUSF}$ by using a key derivation function as follows:

$$KI_{AUSF}=KDF(K_{AUSF},"KI")$$

Where the KI stands for Key Identifier and the subscript indicates for which key it is used, and the KDF stands for the key derivation function. The "KI" input text is a string, but could also be a number. Additional values, like the RAND, RES, serving network name, etc. could also be included in the key derivation function. The AUSF stores this pair of KIs and Keys together in a storage. In this storage, the AUSF may also mark whether the authentication has been completed. The AUSF may also mark whether the keys have been used in previous procedures. The AUSF may also store a timestamp of when the key was derived (not shown in table 5). The storage of the keys at this point in time could look as follows:

TABLE 5

| Identity (IMSI) | KI | Key | Auth. Completed |
|---|---|---|---|
| IMSI1 | $KI_{AUSF1\_IMSI1}$ | $K_{AUSF1\_IMSI1}$ | No |
| IMSI2 | $KI_{AUSF1\_IMSI2}$ | $K_{AUSF1\_IMSI2}$ | Yes |

Note that the AUSF can also use the SUPI instead of the IMSI as an identifier.

Steps 7 and 8 are unchanged from FIG. 6 and we refer to the description with FIG. 6. In step A, the UE now performs the following.

In step A, in addition to creating a non-current security context, the UE also creates an identifier for the $K_{AUSF}$ by using a key derivation function as follows:

$KI_{AUSF}=KDF(K_{AUSF},"KI")$, and $KI_{SEAF}=KDF(K_{SEAF},"KI")$,

Where the KI stands for Key Identifier and the subscript indicates for which key it is used, and the KDF stands for the key derivation function. The "KI" input text is a string, but could also be a number. Additional values, like the RAND, RES, serving network name, etc. could also be included in the key derivation function. The UE stores this pair of KIs and Keys separately. In this storage, the UE may also mark that these keys are part of a non-current security context or whether they are part of the current on. The UE may also store a timestamp of when the key was derived (not shown in table 6). Because 5G AKA does not have an authentication result message to the UE, the authentication result cannot be captured in the table. The storage of the keys at this point in time could look as follows:

TABLE 6

| Type of Key | KI | Key | Context status |
|---|---|---|---|
| SEAF | $KI_{SEAF1}$ | $K_{SEAF1}$ | Non-current |
| AUSF | $KI_{AUSF1}$ | $K_{AUSF1}$ | Non-current |

Note that if a new message is introduced to complete the authentication in 5G AKA, the UE could also mark the status of the authentication message.

Figure 8:
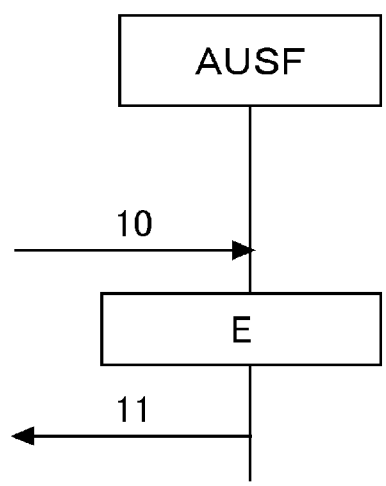
FIG. 8 illustrates a process of marking an authentication as completed in accordance with an embodiment of the present disclosure.

Steps 9 and 10 are unchanged from FIG. 6. After step 10, a new step E is introduced according to FIG. 8. FIG. 8 illustrates a process of marking an authentication as completed in accordance with an embodiment of the present disclosure. The AUSF performs the following at this step.

In step E, after the reception of message in step 10, the AUSF knows that the authentication has completed, and as such, the AUSF now marks the $K_{AUSF}$ authentication as completed. Suppose that the authentication was performed for IMSI1, the resulting table is changed as follows:

TABLE 7

| Identity (IMSI) | KI | Key | Auth. Completed |
|---|---|---|---|
| IMSI1 | $KI_{AUSF1\_IMSI1}$ | $K_{AUSF1\_IMSI1}$ | Yes |
| IMSI2 | $KI_{AUSF1\_IMSI2}$ | $K_{AUSF1\_IMSI2}$ | Yes |

Note that the AUSF could also skip step B and only record successful authentications in the table. Or only temporarily store the $K_{AUSF}$ and move it into this table once the authentication has been successful.

Step 11 is unchanged from FIG. 6. After the reception of the message in step 11, the SEAF may also create a storage of the keys as follows in a new step D according to FIG. 7.

In step D, the SEAF creates an identifier for the $K_{SEAF}$ by using a key derivation function as follows:

$KI_{SEAF}=KDF(K_{SEAF},"KI")$

Where the KI stands for Key Identifier and the subscript indicates for which key it is used, and the KDF stands for the key derivation function. The "KI" input text is a string, but could also be a number. Additional values, like the RAND, RES, serving network name, etc. could also be included in the key derivation function. The SEAF stores this pair of KIs and Keys together in a storage. The SEAF may also store a timestamp of when the key was derived (not shown in table 8). In this storage, the SEAF cannot mark whether it has completed the authentication because no EAP Success message has been sent. However, if the SEAF is somehow informed about the sending of the NAS SMC (e.g. because the AMF and the SEAF are collocated), it could mark whether the key has been taken into use.

TABLE 8

| Identity (IMSI) | KI | Key |
|---|---|---|
| IMSI1 | $KI_{SEAF1\_IMSI1}$ | $K_{SEAF1\_IMSI1}$ |
| IMSI2 | $KI_{SEAF1\_IMSI2}$ | $K_{SEAF1\_IMSI2}$ |

Instead of the IMSI, the SEAF can also use the SUPI as the UE identifier.

Figure 9:
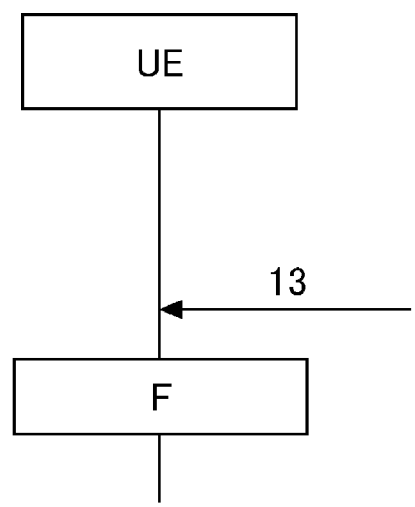
FIG. 9 illustrates a process of changing of status of keys by the UE in accordance with an embodiment of the present disclosure.

The authentication and key agreement for 5G AKA is finished after step 11. However, if the UE receives a secure mode command message (given in FIG. 9 as step 13), the UE can perform a step F. FIG. 9 illustrates a process of changing of status of keys by the UE in accordance with an embodiment of the present disclosure.

In step F, the UE transforms the non-current security context to the current security context. At the same time, the UE also changes the status of the keys in the storage by changing the security context status to "current". For a single authentication run, the storage now looks as follows.

TABLE 9

| Type of Key | KI | Key | Context status |
|---|---|---|---|
| SEAF | $KI_{SEAF1}$ | $K_{SEAF1}$ | Current |
| AUSF | $KI_{AUSF1}$ | $K_{AUSF1}$ | Current |

In accordance with this, the UE, the AUSF and the SEAF calculate an identifier for the keys at steps A, B, and D respectively. A different variant (for both EAP AKA' and 5G AKA) is possible. In this variant, the calculation of the KI is omitted and replaced by using the existing ngKSI which the SEAF already sent to the UE in step 8. This requires the following modifications to the steps as described above.

Step A: UE omits the calculation of the KI, instead, the UE uses the ngKSI as KI for both the $K_{SEAF}$ and the $K_{AUSF}$ and store the ngKSI alongside the $K_{AUSF}$ and $K_{SEAF}$. When calculating the $K_{SEAF}$, the UE will include the ngKSI in the calculation as well, i.e. the $K_{SEAF}$ is bound to the ngKSI as well as other parameters, for example like:

$$K_{SEAF} = KDF(serving\ network\ name, ngKSI, K_{AUSF}, \ldots),$$

Where the KDF is a cryptographic hash and the $K_{AUSF}$ is used as input key. The other parameters include constant values like numbers or texts, etc.

In case of 5G AKA, the UE can also include the ngKSI in the RES* calculation in order to bind the RES* to the ngKSI as well.

5G AKA: Step B: The AUSF does not calculate the KI.
    Step 10: The SEAF additionally includes the ngKSI that it already sent to the UE in the message to the AUSF.
    5G AKA: Step E: The AUSF receives the ngKSI and does the following.

The AUSF calculates the XRES* using the ngKSI received and verifies whether it matches. If it matches, the AUSF knows that the UE has included the same ngKSI in the RES*.

The AUSF checks whether there is a corresponding ngKSI already. If so, that key can be marked for deletion because if the ngKSI was duplicated, the UE would not accept it.

The AUSF calculate the $K_{SEAF}$ including the ngKSI using the same key derivation function and inputs as the UE used when calculating the $K_{SEAF}$, namely:

$$K_{SEAF} = KDF(serving\ network\ name, ngKSI, K_{AUSF}, \ldots),$$

Where the KDF is a cryptographic hash and the $K_{AUSF}$ is used as input key. The other parameters include constant values like numbers or texts, etc.

Next, the AUSF stores the ngKSI as the KI as it would have done at step B.

EAP AKA': Step B: The AUSF receives the ngKSI and does the following.

The AUSF omits calculating the KI. Instead it sets the KI equal to the received ngKSI and stores it according to the described step B.

The AUSF calculates the $K_{SEAF}$ including the ngKSI using the same key derivation function and inputs as the UE used when calculating the $K_{SEAF}$, namely:

$$K_{SEAF} = KDF(serving\ network\ name, ngKSI, K_{AUSF}, \ldots),$$

Where the KDF is a cryptographic hash and the $K_{AUSF}$ is used as input key. The other parameters include constant values like numbers or texts, etc.

This $K_{SEAF}$ is returned to the SEAF in step 11.

Step D: The SEAF sets the KI equal to the ngKSI and stores the KI and the $K_{SEAF}$ in the storage as described.

The advantage of this variant is that there is no need to calculate a KI. Also, by using the ngKSI, the $K_{SEAF}$ and $K_{AUSF}$ can use the same identifier as is used for the security contexts. That way, it is always clear which key corresponds to which security context.

According to second embodiment, multiple identifiers and keys are stored and keep the status for each key that has been derived.

The steps refer to the steps in FIG. 5. In this embodiment, it is assumed that the previous embodiment has already been performed and that the AUSF, SEAF, and UE have created the storage of the keys and the key identifiers according to the previous embodiment. In this embodiment, it is assumed that a UE with IMSI1 is the UE that is being authenticated.

In this case, steps 1-8 are unchanged from FIG. 5 and we refer to the description with FIG. 5. In step A, the UE now does the following in addition.

In step A, in addition to creating a temporary security context, the UE also creates an identifier for the $K_{AUSF}$ by using as described in the previous embodiment. The UE adds this pair of KIs and Keys to the storage of the keys, and marks them with their authentication result according to the previous embodiment. The storage of the keys at this point in time could look as follows. In this case, the keys with subscript 2 are added to the storage.

TABLE 10

| Type of Key | KI | Key | Authentication result? |
| --- | --- | --- | --- |
| SEAF | $KI_{SEAF1}$ | $K_{SEAF1}$ | Completed |
| AUSF | $KI_{AUSF1}$ | $K_{AUSF1}$ | Completed |
| SEAF | $KI_{SEAF2}$ | $K_{SEAF2}$ | Not completed |
| AUSF | $KI_{AUSF2}$ | $K_{AUSF2}$ | Not completed |

Steps 9 and 10 are unchanged from FIG. 5. In step B, the AUSF does the following.

In step B, the AUSF starts with creating an identifier for the $K_{AUSF}$ by using a key derivation function according to the previous embodiment. The AUSF adds this pair of KIs and Keys together in a storage, and may mark whether they have been used or not. The storage of the keys at this point in time could look as follows). As shown in Table 11, a new row for IMSI1 is added.

TABLE 11

| Identity (IMSI) | KI | Key | Used? |
| --- | --- | --- | --- |
| IMSI1 | $KI_{AUSF1\_IMSI1}$ | $K_{AUSF1\_IMSI1}$ | No |
| IMSI2 | $KI_{AUSF1\_IMSI2}$ | $K_{AUSF1\_IMSI2}$ | Yes |
| IMSI1 | $KI_{AUSF2\_IMSI1}$ | $K_{AUSF2\_IMSI1}$ | No |

Note that the AUSF can also use the SUPI instead of the IMSI as an identifier.

Step 11 is unchanged from FIG. 5. After the reception of the message in step 11, the SEAF may also add a key and KI pair to the storage of the keys in step D as shown in FIG. 7.

In step D, the SEAF creates an identifier for the $K_{SEAF}$ by according to the previous embodiment. The SEAF adds this pair of KIs and Keys together in a storage, and may also mark whether it has completed the authentication by sending the EAP Success message to the UE. The storage of the keys at this point in time could look as follows. As shown in Table 12, a new row for IMSI1 has been added.

TABLE 12

| Identity (IMSI) | KI | Key | Auth. Completed? |
| --- | --- | --- | --- |
| IMSI1 | $KI_{SEAF1\_IMSI1}$ | $K_{SEAF1\_IMSI1}$ | Yes |
| IMSI2 | $KI_{SEAF1\_IMSI2}$ | $K_{SEAF1\_IMSI2}$ | Yes |
| IMSI1 | $KI_{SEAF2\_IMSI1}$ | $K_{SEAF2\_IMSI1}$ | No |

Note that the SEAF may set the Authentication Completed field to "No" initially and change it to "Yes" after sending the EAP Success. Instead of the IMSI, the SEAF can also use the SUPI as the UE identifier.

Step 12 is unchanged from FIG. 5. If the SEAF sends an EAP Success message, the UE will take the following action at step C.

In step C, in addition to transforming the temporary security context to a non-current security context, the UE also changes the status of the keys in the storage in this authentication run by changing the authentication result to "completed". After this authentication run, the storage now looks as follows.

TABLE 13

| Type of Key | KI | Key | Authentication result? |
|---|---|---|---|
| SEAF | $KI_{SEAF1}$ | $K_{SEAF1}$ | Completed |
| AUSF | $KI_{AUSF1}$ | $K_{AUSF1}$ | Completed |
| SEAF | $KI_{SEAF2}$ | $K_{SEAF2}$ | Completed |
| AUSF | $KI_{AUSF2}$ | $K_{AUSF2}$ | Completed |

The steps refer to the steps in FIG. 6. In this embodiment, it is assumed that the previous embodiment has already been performed and that the AUSF, SEAF, and UE have created the storage of the keys and the key identifiers according to the previous embodiment. It is assumed that a UE with IMSI1 is the one that is being authenticated.

Steps 1-6 are unchanged from FIG. 6. In step B, the AUSF does the following.

In step B, the AUSF starts with creating an identifier for the $K_{AUSF}$ according to the previous embodiment. The AUSF adds this pair of KIs and Keys to the storage, and may mark whether the authentication has been completed and/or whether the keys have been used in previous procedures. The storage of the keys could look as follows. As shown in Table 14, a row is added for IMSI1.

TABLE 14

| Identity (IMSI) | KI | Key | Auth. Completed |
|---|---|---|---|
| IMSI1 | $KI_{AUSF1\_IMSI1}$ | $K_{AUSF1\_IMSI1}$ | Yes |
| IMSI2 | $KI_{AUSF1\_IMSI2}$ | $K_{AUSF1\_IMSI2}$ | Yes |
| IMSI1 | $KI_{AUSF2\_IMSI1}$ | $K_{AUSF2\_IMSI1}$ | No |

The AUSF can also use the SUPI instead of the IMSI as an identifier.

Steps 7 and 8 are unchanged from FIG. 6 and we refer to the description with FIG. 6. In step A, the UE now does the following.

In step A, according to the previous embodiment, the UE creates one KI for each of the $K_{SEAF}$ and the $K_{AUSF}$, and adds this to the storage. The UE may also mark that these keys are part of a non-current security context or whether they are part of the current on. Because 5G AKA does not have an authentication result message to the UE, the authentication result cannot be captured in the table. The storage of the keys at this point in time could look as follows. As shown in Table 15, two rows are added. It is assumed that the previous keys were taken into use compared to the previous embodiment.

TABLE 15

| Type of Key | KI | Key | Context status |
|---|---|---|---|
| SEAF | $KI_{SEAF1}$ | $K_{SEAF1}$ | Current |
| AUSF | $KI_{AUSF1}$ | $K_{AUSF1}$ | Current |
| SEAF | $KI_{SEAF2}$ | $K_{SEAF2}$ | Non-current |
| AUSF | $KI_{AUSF2}$ | $K_{AUSF2}$ | Non-current |

If a new message is introduced to complete the authentication in 5G AKA, the UE could also mark the status of the authentication message.

Step 9 and 10 are unchanged from FIG. 6. After step 10 a new step E is introduced according to FIG. 8. The AUSF does the following at this step.

In step E, after the reception of message in step 10, the AUSF knows that the authentication has completed, and as such, the AUSF now marks the $K_{AUSF}$ authentication as completed. Suppose that the authentication was performed for IMSI1, the resulting table is changed as follows.

TABLE 16

| Identity (IMSI) | KI | Key | Auth. Completed |
|---|---|---|---|
| IMSI1 | $KI_{AUSF1\_IMSI1}$ | $K_{AUSF1\_IMSI1}$ | Yes |
| IMSI2 | $KI_{AUSF1\_IMSI2}$ | $K_{AUSF1\_IMSI2}$ | Yes |
| IMSI1 | $KI_{AUSF2\_IMSI1}$ | $K_{AUSF2\_IMSI1}$ | Yes |

Note that the AUSF could also skip step B and only record successful authentications in the table. Or only temporarily store the $K_{AUSF}$ and move it into this table once the authentication has been successful.

Step 11 is unchanged from FIG. 6. After the reception of the message in step 11, the SEAF may also create a storage of the keys as follows in a new step D according to FIG. 7.

In step D, the SEAF creates an identifier for the $K_{SEAF}$ according to the previous embodiment and adds this the new pair of KI and $K_{SEAF}$ to the storage. In this storage, the SEAF cannot mark whether it has completed the authentication because no EAP Success message has been sent. However, if the SEAF is somehow informed about the sending of the NAS SMC (e.g. because the AMF and the SEAF are collocated), it could mark whether the key has been taken into use. The new table looks as follows. As shown in Table 17, a row is added for IMSI1.

TABLE 17

| Identity (IMSI) | KI | Key |
|---|---|---|
| IMSI1 | $KI_{SEAF1\_IMSI1}$ | $K_{SEAF1\_IMSI1}$ |
| IMSI2 | $KI_{SEAF1\_IMSI2}$ | $K_{SEAF1\_IMSI2}$ |
| IMSI1 | $KI_{SEAF2\_IMSI1}$ | $K_{SEAF2\_IMSI1}$ |

Instead of the IMSI, the SEAF can also use the SUPI as the UE identifier.

The authentication and key agreement for 5G AKA is finished after step 11. However, if the UE receives a secure mode command message (given in FIG. 9 as step 13), the UE can perform a step F.

In step F, the UE transforms the non-current security context to the current security context. At the same time, the UE also changes the status of the keys in the storage by changing the security context status to "current". For a single authentication run, the storage now looks as follows.

TABLE 18

| Type of Key | KI | Key | Context status |
|---|---|---|---|
| SEAF | $KI_{SEAF1}$ | $K_{SEAF1}$ | Current |
| AUSF | $KI_{AUSF1}$ | $K_{AUSF1}$ | Current |
| SEAF | $KI_{SEAF2}$ | $K_{SEAF2}$ | Current |
| AUSF | $KI_{AUSF2}$ | $K_{AUSF2}$ | Current |

It is to be noted that if no keys are deleted, then many keys will be stored. However, in order to decide which keys are to be deleted, some decisions will have to be taken. The listings of the decisions are as follows.

In EAP AKA', a native security context (resulting from an authentication on 5G) can have the following statuses.
Current: the security context is being used.
Non-current: the security context has not been taken into use yet.
Temporary: the authentication has not completed.

For each security context, the UE has a corresponding $K_{AUSF}$ and $K_{SEAF}$. In order to remain in a good state, the UE could handle the deletion of keys as follows.
When receiving a NAS SMC message (like step F in FIG. 9) that takes a temporary security context into use or when receiving an EAP Success (step C in FIG. 5) message, the UE knows that the authentication was successful. The UE can delete any older keys including those corresponding to the current security context.
In the case that the UE deletes the temporary security context due to a timeout, the UE will not delete the $K_{AUSF}$ and $K_{SEAF}$, but retain it in memory. If another authentication run results in a new temporary security context, the UE will remove the $K_{AUSF}$ and $K_{SEAF}$ that corresponded to the removed temporary security context and store the new $K_{AUSF}$ and $K_{SEAF}$ as explained in the previous embodiment.

At the AUSF, the decisions are taken as follows.
The AUSF stores at least two keys per UE, namely, the following two.
The most recent one that resulted from a successful authentication as indicated by the authenticate result message (step B).
The second most recent one that resulted from a successful authentication.
Any older keys are removed from memory.
At the SEAF, the decisions are taken as follows.
The SEAF deletes and stores at least two keys per UE, namely as follows:
The two most recent ones which were the result of a successful authentication (step D).
If the SEAF sends an EAP Success message, it deletes any older keys.
Any older keys are removed from memory.

In 5G AKA, a native security context (resulting from an authentication on 5G) can have the following statuses.
Current: the security context is being used.
Non-current: the security context has not been taken into use yet.

For each security context, the UE has a corresponding $K_{AUSF}$ and $K_{SEAF}$. In order to remain in a good state, the UE could handle the deletion of keys as follows.
When receiving a NAS SMC message (step F in FIG. 9) that takes a non-current security context into use, the UE knows that the authentication was successful. The UE can delete any older keys including those corresponding to the current security context that is being replaced.
In the case that the UE overwrites a non-current security context due to a new authentication, it will delete the $K_{AUSF}$ and $K_{SEAF}$ related to the previous non-current security context.

At the AUSF, the decisions are taken as follows.
The AUSF stores at least two keys per UE, namely, the following two.
The most recent one that resulted from a successful authentication as indicated by the authenticate result message (step E).
The second most recent one that resulted from a successful authentication.
Any older keys are removed from memory.
At the SEAF, the decisions are taken as follows.
The SEAF deletes and stores at least two keys per UE, namely as follows.
The two most recent ones which were the result of a successful authentication (step D).
Or, if the SEAF knows about the sending of the NAS SMC message, it also stores the most recent one that was taken into use.
Any older keys are removed from memory.

Despite the actions taken in the previous embodiments, the serving network can still cause a synchronization error between the $K_{AUSF}$ in the UE and the one in the AUSF. Similarly, where $K_{AUSF}$ and AUSF are used, also SEAF and $K_{SEAF}$ could be read. The same problem would occur resulting in the SEAF and the UE to be out of sync with respect to the $K_{SEAF}$.

For example, when using EAP-AKA' the serving network could run the following procedure.
1. Complete a full EAP AKA' and take the security context (sc1) into use. Both AUSF and UE now have a $K_{AUSF}$ that corresponds to sc1.
2. Initiate a new EAP AKA' procedure by sending message in step 4 of FIG. 5 including the SUPI instead of the SUCI and follow though until step 11. After step 11, the SEAF sends an authentication failed message to the UE so that the UE deletes the temporary security context (sc2) that it created at step A. The situation is now as follows.
AUSF has a $K_{AUSF}$ corresponding to sc1 and one $K_{AUSF}$ corresponding to sc2.
UE has a $K_{AUSF}$ corresponding to sc1.
3. Initiate a new EAP AKA' procedure according to the previous step and follow though until step 11. After step 11, the SEAF sends an authentication failed message to the UE so that the UE deletes the temporary security context (sc3) that it created at step A. The situation is now as follows.
AUSF now has deleted the $K_{AUSF}$ corresponding to sc1 and has retained one $K_{AUSF}$ corresponding to sc2 and one $K_{AUSF}$ corresponding to sc3.
UE has a $K_{AUSF}$ corresponding to sc1, because the other two authentications failed.

As a result, the AUSF and UE are out of sync with respect to the $K_{AUSF}$.

When using 5G AKA, the serving network could achieve the same situation as follows.
1. Complete a full 5G AKA and take the security context (sc1) into use. Both AUSF and UE now have a $K_{AUSF}$ that corresponds to sc1.
2. Initiate a new 5G AKA procedure by sending message 4 of FIG. 6 including the SUPI instead of the SUCI and follow though until step 11. After step 11, the SEAF sends an authentication failed to the UE.

AUSF has a $K_{AUSF}$ corresponding to sc1 and one $K_{AUSF}$ corresponding to sc2.

UE has a $K_{AUSF}$ corresponding to sc1.

3. Initiate a new 5G AKA procedure according to the previous step and follow though until step 11. After step 11, the SEAF sends an authentication failed message to the UE so that the UE deletes the temporary security context (sc3) that it created at step A. The situation is now as follows.

AUSF now has deleted the $K_{AUSF}$ corresponding to sc1 and has retained one $K_{AUSF}$ corresponding to sc2 and one $K_{AUSF}$ corresponding to sc3.

UE has a $K_{AUSF}$ corresponding to sc1, because the other two authentications failed.

As a result, the AUSF and UE are out of sync with respect to the $K_{AUSF}$. Similarly, where $K_{AUSF}$ and AUSF are used, also SEAF and $K_{SEAF}$ could be read. The same problem would occur resulting in the SEAF and the UE to be out of sync with respect to the $K_{SEAF}$.

This emerging problem can be addressed by using the embodiments presented earlier with some modifications. For this mechanism to work, we use the fact that each initial authentication to a network is done using the SUCI. The UE either includes the SUCI in the message in step 1 of FIGS. 5 and 6 or in message in step 3 in the FIGS. 5 and 6. The SUCI is the Subscription Concealed Identifier which contains amongst others the SUPI, but encrypted. As such, the serving network only learns the SUPI in step 11. This is contrary to subsequent authentications, because the serving network can initiate an authentication at any point in time by sending an authentication request to the home network containing the SUPI.

Using this fact, the storage of the UE and the AUSF is modified as follows.

The UE will additionally store whether the $K_{AUSF}$ was obtained after a successful authentication using a SUCI by adding a flag that indicates whether the SUCI was used for this authentication run. This would look as follows.

| Type of Key | KI | Key | Context status | SUCI? |
| --- | --- | --- | --- | --- |
| SEAF | $KI_{SEAF1}$ | $K_{SEAF1}$ | Current | Yes |
| AUSF | $KI_{AUSF1}$ | $K_{AUSF1}$ | Current | Yes |
| SEAF | $KI_{SEAF2}$ | $K_{SEAF2}$ | Non-current | No |
| AUSF | $KI_{AUSF2}$ | $K_{AUSF2}$ | Non-current | No |

As long as the UE is connected to the same network, the UE will not delete this key that is resulted from an authentication using the SUCI. The UE adds this flag in step A or in step F. Either option results in the same table. For any new keys that are being added without the SUCI being used for the authentication, the UE sets the flag to no. The keys for which the flag are set to yes are only deleted once a new authentication using the SUCI is performed or the UE attaches to a new network.

The AUSF will, like the UE, store whether the $K_{AUSF}$ was obtained after a successful authentication using a SUCI. In step 4, the AUSF will learn whether the SUPI or SUCI has been used for the authentication and so the AUSF knows whether this is the first authentication to the network. Alternatively, the AUSF may also add the PLMN ID to the table to see whether the UE now authenticates to a new network.

As long as the new authentication requests continue to come from the same network, the AUSF will retain the $K_{AUSF}$ related to the authentication using the SUCI. Only once a new SUCI is used or the UE attaches to a new network (that is observed because the authentication request message 4 comes from a different network), the AUSF can delete the $K_{AUSF}$ associated with the first authentication to a network.

In this embodiment, the KI for the $K_{AUSF}$ can also be set equal to the SUCI that was used in the authentication run or the derivation of the KI can include the SUCI in addition to the $K_{AUSF}$. Similarly, the KI for the $K_{SEAF}$ can be set equal to the SUCI or derived from the SUCI and/or the $K_{SEAF}$. This means that the storage of the UE, the SEAF and the AUSF will contain a KI that is (derived from) the SUCI instead of a KI that is solely derived from the respective key it refers to.

In NPL1, there are two procedures that use the $K_{AUSF}$ to integrity protect or encrypt information exchange between the AUSF and the UE. These procedures are:

Steering of Roaming, according to clauses 6.14.2.1 and 6.14.2.2;

UE Parameters Update, according to clause 6.15.2.1.

Both of these procedures are network initiated.

In the state of the art, both of these procedures use the same methods to initialize the respective counters and the respective keys for usage. That is, the counter associated with the service is set to 0 whenever the $K_{AUSF}$ is derived. As such, there is only one counter available for each service and this counter is associated with the service, rather than with the $K_{AUSF}$.

In order to use the methods disclosed in the present disclosure, a counter is associated with the $K_{AUSF}$ that is used (instead of a counter associated with the service). Referring to FIGS. 5 and 6, following happens at the various steps of FIGS. 5 and 6 (for example for the case of Steering of Roaming).

In step B, the AUSF derives a new $K_{AUSF}$ and at this time also sets a counter for the Steering of Roaming. This counter is initialized to 0. In addition, the AUSF will store this counter together with the $K_{AUSF}$. The storage thus contains counters in addition to the key identifiers and the keys.

In step A, the UE derives a new $K_{AUSF}$ and at this time also sets a counter for the Steering of Roaming. This counter is initialized to 0. In addition, the UE will store this counter together with the $K_{AUSF}$. The storage thus contains counters in addition to the key identifiers and the keys.

For the UE Parameters Update at the same steps, a counter associated with the UE parameters update is initialized as well and stored alongside the counter.

Whenever a $K_{AUSF}$ is deleted from the storage at the UE or the AUSF, the UE or AUSF will also delete the counters associated with this $K_{AUSF}$.

Figure 10:
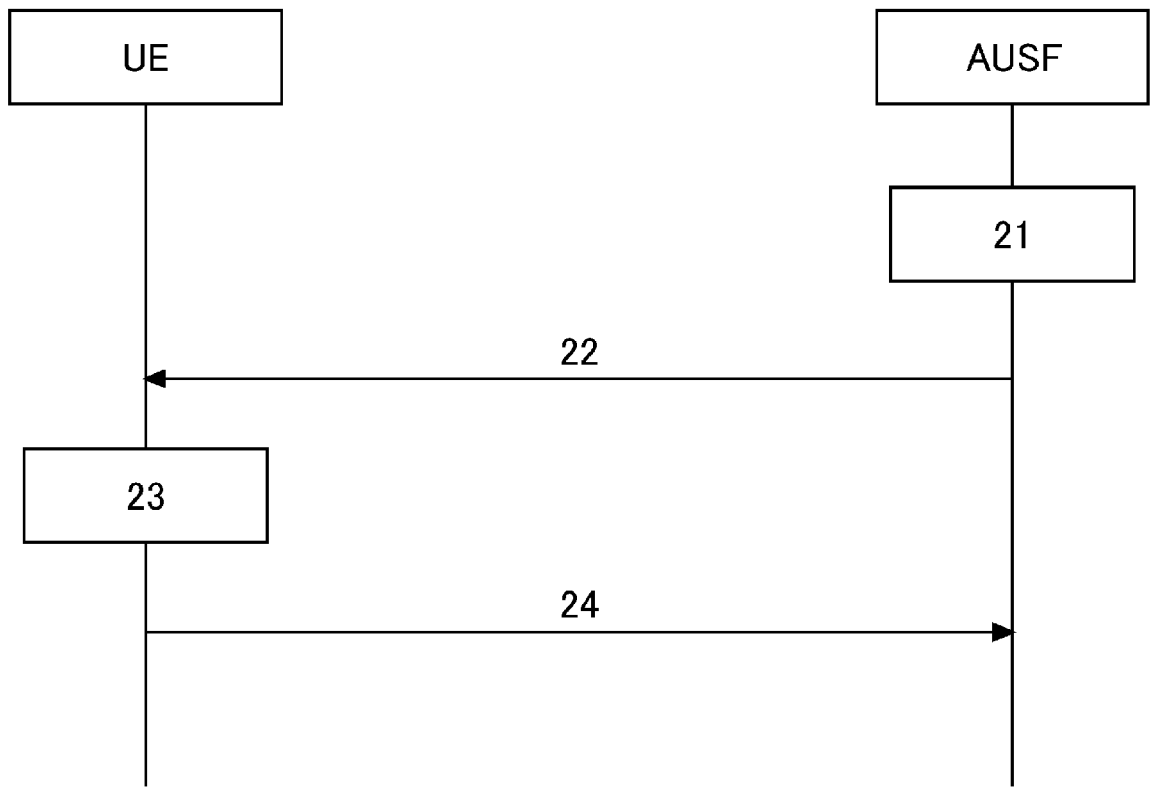
FIG. 10 illustrates a network initiated procedure for using the $K_{AUSF}$ in accordance with an embodiment of the present disclosure.

When the key is used, the following procedure is followed as shown in FIG. 10. FIG. 10 illustrates a network initiated procedure for using the $K_{AUSF}$ in accordance with an embodiment of the present disclosure.

In step 21, the AUSF receives a message to be security protected using the $K_{AUSF}$. The AUSF will first retrieve one of the $K_{AUSF}$s associated with the UE from memory with its associated counters. Then, the AUSF will follow the procedure as specified in NPL1. The AUSF calculates a cryptographic hash using the $K_{AUSF}$, the counter associated with the procedure, and the plain text content of the message. Additionally, the AUSF will also include the KI in the message so that the UE can identify which key has been used. The AUSF will compose a message including the plain text to be protected, the counter value, the KI and the cryptographic hash derived from the plain text, counter, KI, and $K_{AUSF}$.

In step 22, the message including the plain text, the KI, the counter and the cryptographic hash is transferred to the UE, for example using NAS DL transport.

In step 23, the UE receives the message. Based on the KI included in the message, the UE will search for a $K_{AUSF}$ associated with this KI in the key storage. If the UE finds a matching KI, the UE will retrieve the $K_{AUSF}$ and the respective counters from memory. Next, the UE uses the retrieved $K_{AUSF}$ to verify the cryptographic hash using the plain text message content, the counter in the message, the KI, and the $K_{AUSF}$. Next, the UE will compare whether the counter value in the message is greater than or equal to the counter value from storage. If so, the UE replaces the counter value in storage with the counter value from the message. If the procedure terminates here, the UE will store the new counter value at step 23.

If a response is required, the UE will calculate a response using the same key and protect the response similarly: calculating a cryptographic hash using the $K_{AUSF}$, KI, plain text, and the counter value incremented by 1. The UE stores the new counter value in the storage. If required, the message containing the plain text message, the KI, the counter value and the cryptographic hash will be transmitted to the AUSF in step 24. Upon reception of the message, the AUSF will check the value of the cryptographic hash. If the value of the cryptographic hash is correct, the AUSF will take notice of the content of the message.

If the UE cannot find the $K_{AUSF}$ corresponding to the KI extracted from the message of step 22, the UE retrieves another $K_{AUSF}$ with its associated KI and counter value from memory. The UE increments the counter by 1 and composes a message including an error indication, the KI, the counter value and a cryptographic hash derived from the message contents and the $K_{AUSF}$. The UE sends the message in step 24. The UE now stores the new counter in the storage.

When the AUSF receives the message 24 containing an error code, the AUSF will do the following:
Extract the KI from the message.
Check for the presence of a $K_{AUSF}$ corresponding to the KI in the storage.
If present:
(1) The AUSF retrieves the associated $K_{AUSF}$ and counters from storage.
(2) Verify the correctness of the cryptographic hash by calculating the cryptographic hash from the message content, the counter in the message, the KI and the $K_{AUSF}$ retrieved from storage; if correct the AUSF continues with the next step.
(3) The AUSF increments the counter from storage by 1 and checks whether the counter included in the message from the UE is equal to or greater than the counter associated with this $K_{AUSF}$. If the counter included in the message from the UE is equal to or greater than the counter associated with this $K_{AUSF}$, the AUSF sets the counter value retrieved from storage equal to the counter value included in the message from the UE, and continues with the next step. If the counter value in the UE message is smaller than the counter associated with this $K_{AUSF}$, the AUSF aborts the procedure.
(4) Now, the AUSF recomposes the message according to step 21, but now uses the $K_{AUSF}$ retrieved from memory based on the KI indicated by the UE, the counter value after incrementing by 1, the same plain text as in step 21, and the KI corresponding to the $K_{AUSF}$ used.
(5) The AUSF sends a second message in step 22 to the UE.
(6) If this message is successfully received by the UE and the UE acknowledges correct reception a new message in step 24, the AUSF may delete the KI and $K_{AUSF}$ used for the first message in step 22 from memory.

If not present:
(1) The AUSF will select a next KI associated with the same IMSI and restart the procedure from step 21 by using this newly selected KI and associated key and counters. The AUSF may know which KIs have been used either by keeping a register of which keys have been used with the UE or because the UE reports the KI value as part of the error code that is reported in message of step 24. By going through the error cases, the AUSF may find that it has used all the KI values in storage without success. In such a case, the AUSF may delete all the KI, $K_{AUSF}$, and associated counters from storage.

The selection of the key to be used by the AUSF can be as follows.

In the first step 21, the AUSF always selects the most recent key from storage. If after using this key for message in step 22, the AUSF receives an acknowledgement in message of step 24, the AUSF can delete any older keys from storage.

If the first message in step 22 was unsuccessful, it is meaning that the AUSF received an error message in response and doesn't have the KI corresponding to the error message, the AUSF will select the next key from storage if one is available.

The selection mechanism used by the UE follows the mechanism used by the AUSF, so first, the most recent one is selected and if that fails, selects the next until the list is exhausted.

A different selection mechanism can be used in case the UE and AUSF are configured to always keep $K_{AUSF}$ associated with the latest authentication procedure for which the SUCI was used. In such a case, the first key to be selected is the one associated with the latest authentication procedure. If that fails, the UE and AUSF can select another key based on the scheme presented here.

In the above, the description refers to AUSF and $K_{AUSF}$. A similar procedure could be run between the SEAF and the UE. In that case, the SEAF takes the place of the AUSF in the above and the $K_{AUSF}$ will be replaced with the $K_{SEAF}$ because the SEAF does not have access to the $K_{AUSF}$. The rest of the procedure remains unchanged.

Figure 11:
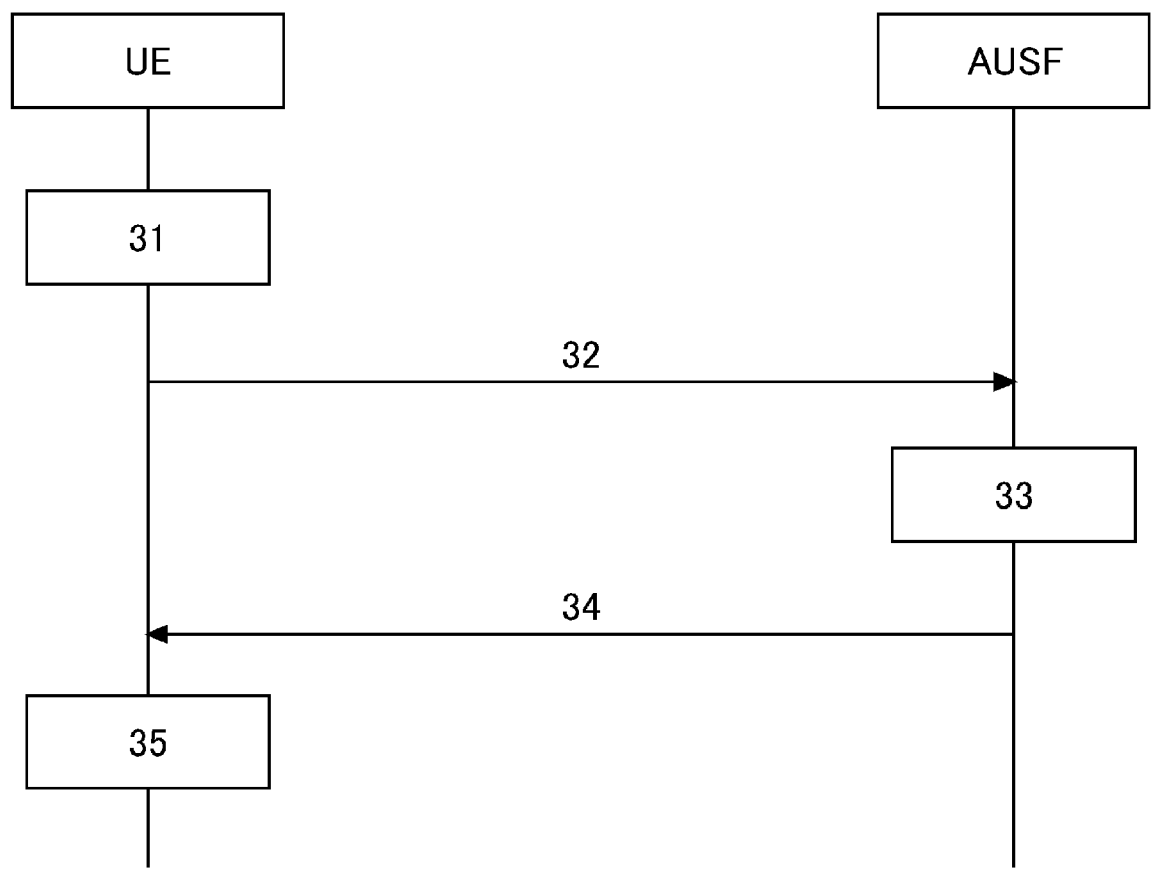
FIG. 11 illustrates a UE initiated procedure for using the $K_{AUSF}$ in accordance with an embodiment of the present disclosure.

In addition to the network initiated procedures, the $K_{AUSF}$ can also be used in UE initiated procedures. One example of such a procedure is the reuse of $K_{AUSF}$ for authentication and key agreement with a third party service (also called AKMA, Authentication and Key Agreement for Applications based on 3GPP subscriber credentials, or GBA, Generic Bootstrapping Architecture). In these procedures, the UE contacts an application server and authenticates to this application server using a key derived from $K_{AUSF}$. For this application, it is also important that the keys are synchronized. An abstract version of the procedure is shown in FIG. 11. FIG. 11 illustrates a UE initiated procedure for using the $K_{AUSF}$ in accordance with an embodiment of the present disclosure.

The steps according to FIG. 11 are as follows.

Before step 31, the UE is triggered to initiate the procedure. This could for example be because the UE sent a request to an application server for service. The application server has triggered an authentication request and indicated compatibility with AKMA or GBA. In response the UE now decides to contact another server in the network (this could be AUSF or a server dedicated to the AKMA or GBA service) in order to trigger the derivation of a key from $K_{AUSF}$.

Another example of how the UE could be triggered is because the UE has the need to communicate with the AUSF for updating parameters or requesting a different service. The way the UE is triggered may impact how the UE sends the message, i.e. which intermediate nodes the message will traverse, but may not impact the way the UE protects the information exchange with the AUSF and selects the correct $K_{AUSF}$ to be used.

In step 31, the UE retrieves one of the $K_{AUSF}$s storage together with its associated counters. Then, the UE will compose a message including the command or request of the UE, the counter value, the KI and a cryptographic hash to integrity protect the message. The cryptographic hash is calculated from the counter value, the KI, the plain text message including a command or request and the $K_{AUSF}$. The message may also contain the UE identifier.

In step 32, the message including the plain text, the KI, the counter and the cryptographic hash is transferred to the AUSF. The message is possibly encapsulated in another message and possibly via other nodes. The encapsulating message may contain additional values such as the UE identifier.

In step 33, the AUSF receives the message. Based on the KI in the message, the AUSF will search for a $K_{AUSF}$ associated with this KI and UE identifier in the key storage. If the AUSF finds a matching KI, the AUSF will retrieve the $K_{AUSF}$ and the respective counters from memory. Next, the AUSF uses the retrieved $K_{AUSF}$ to verify the cryptographic hash using the plain text message content, the counter included in the message, the KI, and the $K_{AUSF}$. Next, the AUSF will compare whether the counter value in the message is greater than or equal to the counter value from storage. If the counter value in the message is greater than or equal to the counter value from storage, the AUSF replaces the counter value in storage with the counter value from the message. If the procedure terminates here, the AUSF will store the new counter value at step 33.

If a response is required, the AUSF will calculate a response using the same key and protect the response similarly: calculating a cryptographic hash using the $K_{AUSF}$, KI, plain text, and the counter value incremented by 1. The AUSF stores the new counter value in the storage. If required, the message containing the plain text message, the KI, the counter value and the cryptographic hash will be transmitted to the UE in step 34. Upon reception of the message, the UE will check the value of the cryptographic hash. If the value of the cryptographic hash is correct, the UE will take notice of the content of the message.

If the AUSF cannot find the $K_{AUSF}$ corresponding to the KI extracted from the message of step 32, the AUSF retrieves another $K_{AUSF}$ associated with this UE Identifier with its associated KI and counter value from memory. The AUSF increments the counter by 1 and composes a message including an error indication, the KI, the counter value and a cryptographic hash derived from the message contents and the $K_{AUSF}$. The AUSF sends the message in step 34. The AUSF now stores the new counter in the storage.

Upon reception of the message in step 35, the UE will check whether the command was executed successfully and verify the integrity of the message by calculating the cryptographic hash. If an error was received, the UE will proceed as follows:

Extract the KI from the error message.
Check for the presence of a $K_{AUSF}$ corresponding to the KI in the storage.
If present:
(1) The UE retrieves the associated $K_{AUSF}$ and counters from storage.
(2) The UE verifies the correctness of the cryptographic hash by calculating the cryptographic hash from the message content, the counter in the message, the KI and the $K_{AUSF}$ retrieved from storage. if the cryptographic hash is correct, the UE continues with the next step.
(3) The UE increments the counter from storage by 1 and checks whether the counter included in the message from the AUSF is equal to or greater than the counter associated with this $K_{AUSF}$. If the counter included in the message from the AUSF is equal to or greater than the counter associated with this $K_{AUSF}$, the UE sets the counter value retrieved from storage equal to the counter value included in the message from the AUSF and continues. If the counter value in the AUSF message is smaller than the counter associated with this $K_{AUSF}$, the UE aborts the procedure.
(4) Now, the UE recomposes the message according to step 31, but now uses the $K_{AUSF}$ retrieved from memory based on the KI indicated by the AUSF, the counter value after incrementing by 1, the same plain text as in step 31, and the KI corresponding to the $K_{AUSF}$ used.
(5) The UE sends a second message in step 32 to the AUSF.
(6) If this message is successfully received by the AUSF and the AUSF acknowledges correct reception a new message in step 34, the UE may delete the KI and $K_{AUSF}$ used for the first message in step 32 from memory.
If not present:
(1) The UE will select a next KI and restart the procedure from step 31 by using this newly selected KI and associated key and counters. The UE may know which KIs have been used either by keeping a register of which keys have been used or because the AUSF reports the KI value as part of the error code that is reported in message of step 34. By going through the error cases, the UE may find that it has used all the KI values in storage without success. In such a case, the UE may delete all the KI, $K_{AUSF}$, and associated counters from storage.

The key selection mechanisms can follow those of described for network initiated procedures.

In the above, the description refers to AUSF and $K_{AUSF}$. A similar procedure could be run between the SEAF and the UE. In that case, the SEAF takes the place of the AUSF in the above and the $K_{AUSF}$ will be replaced with the $K_{SEAF}$ because the SEAF does not have access to the $K_{AUSF}$. The rest of the procedure remains unchanged.

In the above, it is assumed that the SEAF or AUSF store the key that is referenced by the UE. The AUSF and SEAF could also store a key derived from that key, such as a key for a specific application or a bootstrapping key that is used in later procedures to derive a further key. For example, if the service is called "service_1", the key for service_1 could be $K_{service\_1}$ and the KI could be derived from this key according to the explanations for the $K_{SEAF}$ or the $K_{AUSF}$. Alternatively, the KI used could also be the KI that is derived from the $K_{SEAF}$ or $K_{AUSF}$. This is advantageous if the UE has multiple services, say service_1, service_2, service_3, etc., but would only need to store one KI for keys for services derived from $K_{AUSF}$ and one for keys derived from $K_{SEAF}$.

A further possibility is that the AUSF and SEAF derive the service specific key and (optionally service specific) KI when the authentication happens and push this data to a key server for this service. For example, if service_1 uses $K_{service\_1}$, the AUSF would perform the following steps when an authentication happens, for example at step B or step E.
1. The AUSF derives a KI from $K_{AUSF}$.
2. The AUSF derives $K_{service\_1}$ from $K_{AUSF}$, e.g. $K_{service\_1}$=KDF ($K_{AUSF}$, "Service_1").
3. The AUSF sends the $K_{service\_1}$ and the KI to Key Server for service_1.
4. The AUSF continues the authentication as normal.

The UE could either derive the keys upon authentication as well or derive the keys as necessary because the UE has access to the key $K_{AUSF}$ which is the root key for these services.

Whenever a UE would like to use one of the services, say service_1, the UE would do the following, according to FIG. 11, where the key server now takes the place of the AUSF.

Before step 31, the UE is triggered to initiate the procedure. This could for example be because the UE sent a request to an application server for service. The application server has indicated that it supports service_1, e.g. an AKMA. In response the UE now decides to contact the Service 1 Key Server in the network.

In step 31, the UE retrieves one of the $K_{AUSF}$s storage together with its associated counters. Then, the UE will compose a message including the command or request of the UE, the counter value, the KI and a cryptographic hash to integrity protect the message. If the implementation uses service specific KIs, the UE will calculate first the service specific key and subsequently the corresponding KI. The cryptographic hash is calculated from the counter value, the KI, the plain text message including a command or request and the $K_{service\_1}$ The message may also contain the UE identifier.

In step 32, the message including the plain text, the KI, the counter and the cryptographic hash is transferred to the Key Server. The message is possibly encapsulated in another message and possibly via other nodes. The encapsulating message may contain additional values such as the UE identifier.

In step 33, the Key Server receives the message. Based on the KI in the message, the Key Server will search for a $K_{service\_1}$ associated with this KI and UE identifier in the key storage. If the Key Server finds a matching KI, the Key Server will retrieve the $K_{service\_1}$ and the respective counters from memory. Next, the Key Server uses the retrieved $K_{service\_1}$ to verify the cryptographic hash using the plain text message content, the counter in the message, the KI, and the $K_{service\_1}$. Next, the Key Server will compare whether the counter value in the message is greater than or equal to the counter value from storage. If the counter value in the message is greater than or equal to the counter value from storage, the Key Server replaces the counter value in storage with the counter value from the message. If the procedure terminates here, the Key Server will store the new counter value at step 33.

For error cases, the Key Server can either handle the errors according to the description with FIG. 11, or refer back to the AUSF. For example, if the Key Server can't find a key, it can refer to the AUSF for a new authentication.

Figure 12:
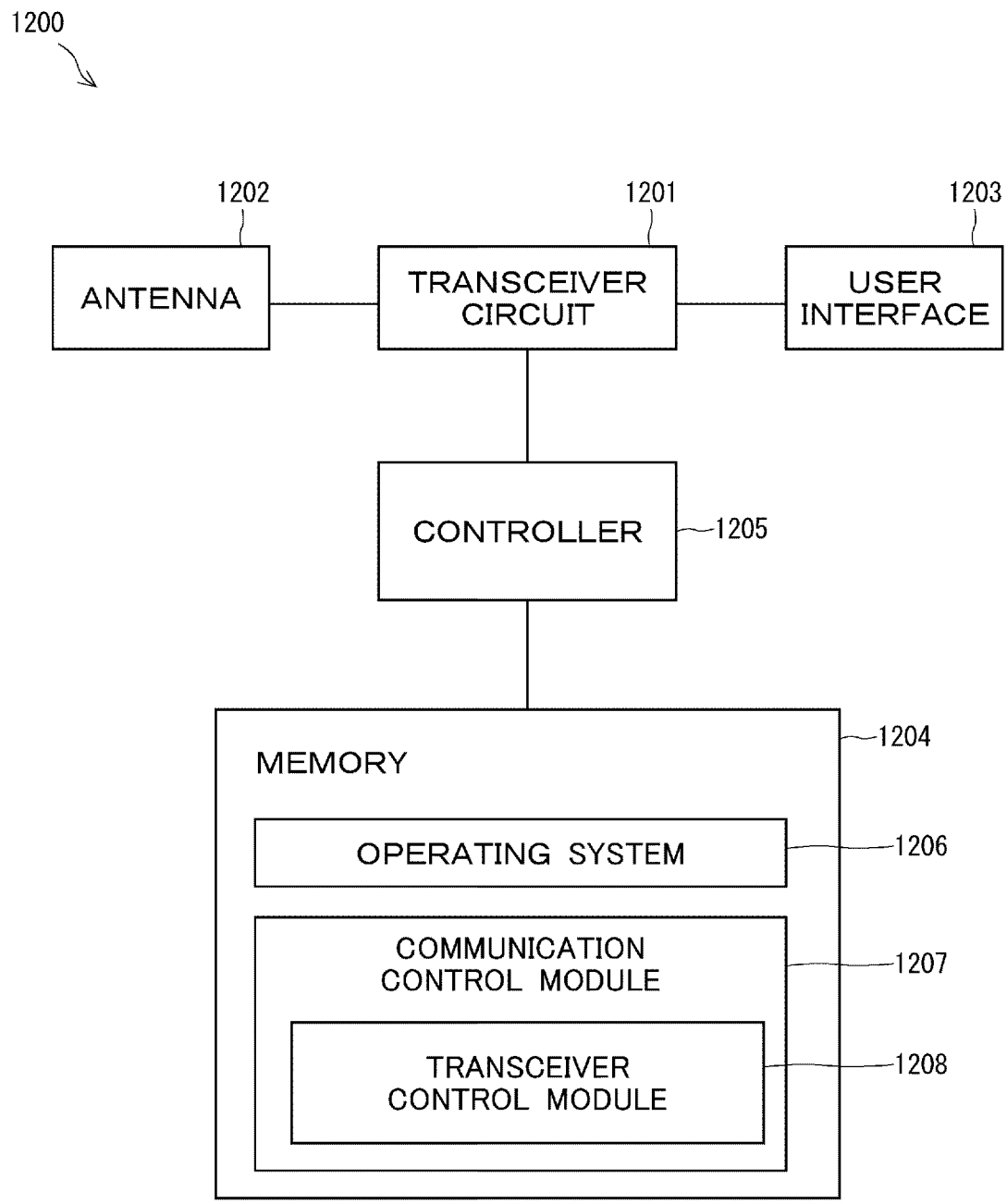
FIG. 12 shows a block diagram for a user equipment in accordance with the present disclosure.

FIG. 12 is a block diagram illustrating the main components of the UE. FIG. 12 shows a block diagram for a user equipment in accordance with the present disclosure. As shown, the UE 1200 includes a transceiver circuit 1201 which is operable to transmit signals to and to receive signals from the connected node(s) via one or more antenna 1202. Although not necessarily shown in FIG. 12, the UE 1200 will of course have all the usual functionality of a conventional mobile device (such as a user interface 1203) and this may be provided by any one or any combination of hardware, software and firmware, as appropriate. Software may be pre-installed in the memory 1204 and/or may be downloaded via the telecommunication network or from a removable data storage device (RMD), for example.

A controller 1205 controls the operation of the UE 1200 in accordance with software stored in a memory 1204. For example, the controller 1205 may be realized by Central Processing Unit (CPU). The software includes, among other things, an operating system 1206 and a communications control module 1207 having at least a transceiver control module 1208. The communications control module 1207 (using its transceiver control sub-module) is responsible for handling (generating/sending/receiving) signalling and uplink/downlink data packets between the UE 1200 and other nodes, such as the base station/(R)AN node, a MME, the AMF (and other core network nodes). Such signalling may include, for example, appropriately formatted signalling messages relating to connection establishment and maintenance (e.g. RRC messages,), NAS messages such as periodic location update related messages (e.g. tracking area update, paging area updates, location area update) etc.

Figure 13:
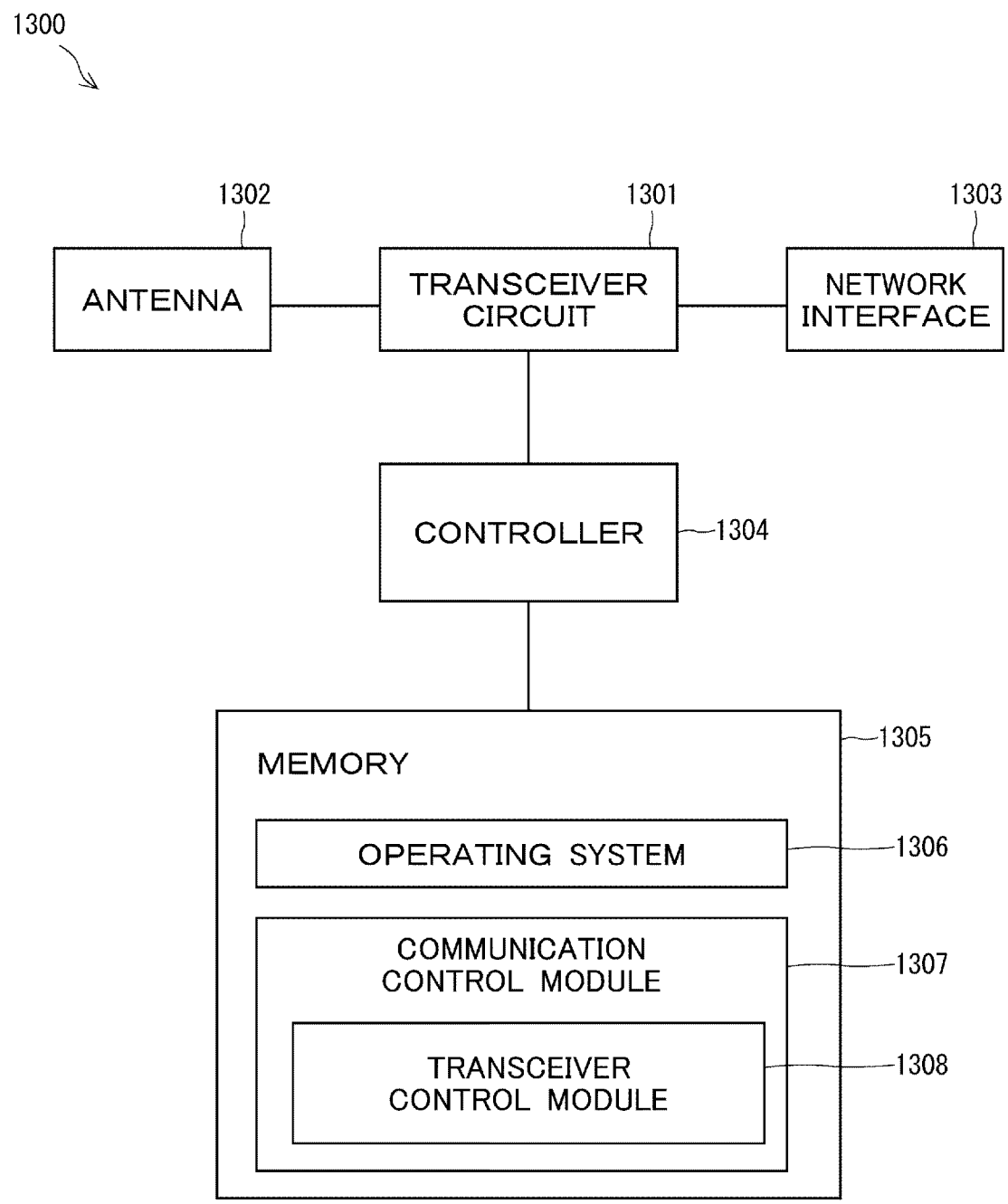
FIG. 13 shows a block diagram for an (R)AN node in accordance with the present disclosure.

FIG. 13 is a block diagram illustrating the main components of an exemplary (R)AN node, for example a base station ('eNB' in LTE, 'gNB' or 'ngNB' in 5G). FIG. 13 shows a block diagram for an (R)AN node in accordance with the present disclosure. As shown, the (R)AN node 1300 includes a transceiver circuit 1301 which is operable to transmit signals to and to receive signals from connected UE(s) via one or more antenna 1302 and to transmit signals to and to receive signals from other network nodes (either directly or indirectly) via a network interface 1303. A controller 1304 controls the operation of the (R)AN node 1300 in accordance with software stored in a memory 1305. For example, the controller 1304 may be realized by Central Processing Unit (CPU). Software may be pre-installed in the memory 1305 and/or may be downloaded via the telecommunication network or from a removable data storage device (RMD), for example. The software includes, among other things, an operating system 1306 and a communications control module 1307 having at least a transceiver control module 1308.

The communications control module 1307 (using its transceiver control sub-module) is responsible for handling (generating/sending/receiving) signalling between the (R)AN node 1300 and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case.

The controller 1304 is also configured (by software or hardware) to handle related tasks such as, when implemented, UE mobility estimate and/or moving trajectory estimation.

Figure 14:
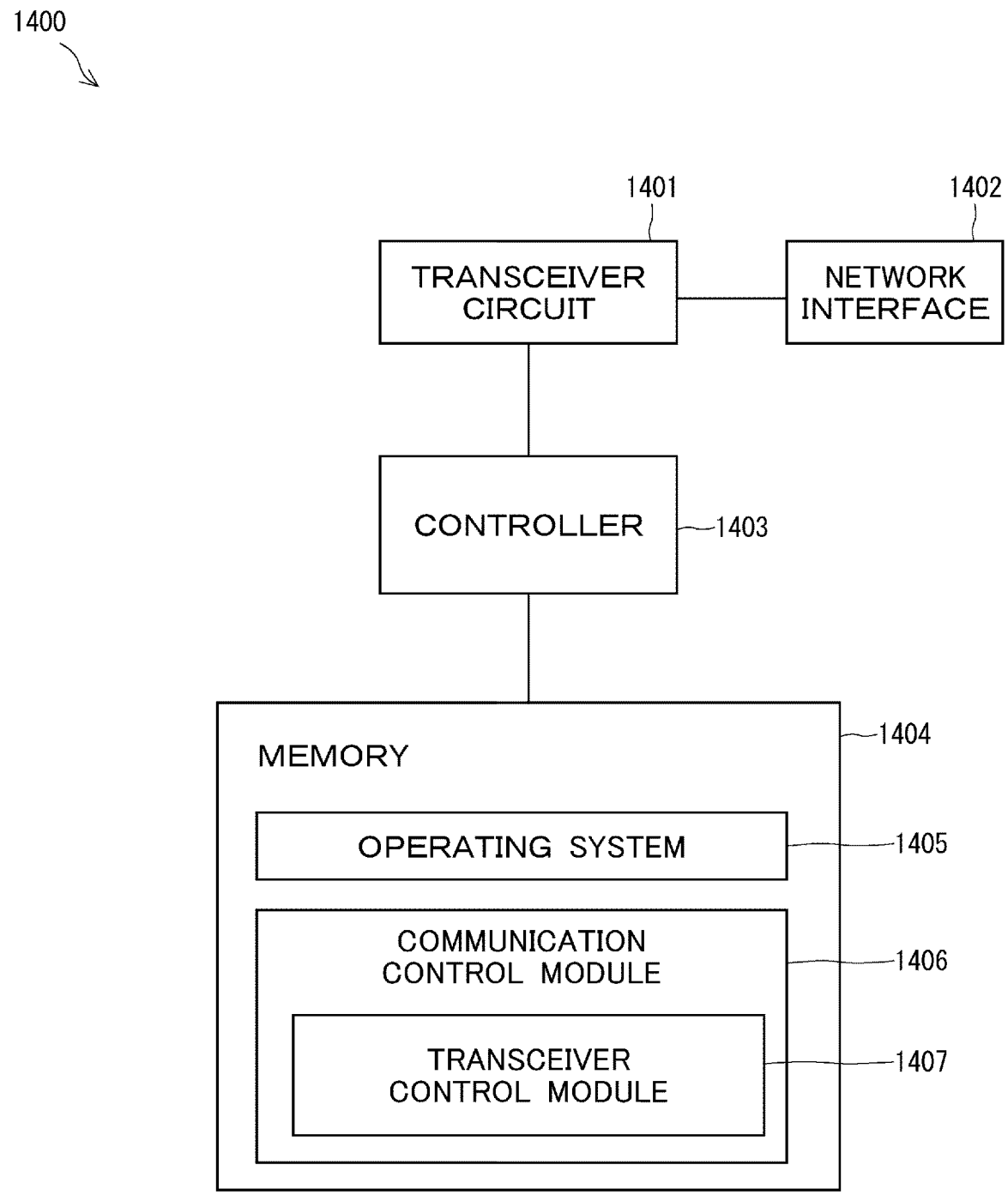
FIG. 14 shows a block diagram for a core network node in accordance with the present disclosure.

FIG. 14 is a block diagram illustrating the main components of an exemplary core network node, for example an AMF, a SMF, a SEAF, an AUSF, an UPF, an UDM, an ARPF, SIDF, a PCF, an AF etc. FIG. 14 shows a block diagram for a core network node in accordance with the present disclosure. The core network node 1400 is included in the 5G Core Network (5GC). As shown, the core network node 1400 includes a transceiver circuit 1401 which is operable to transmit signals to and to receive signals from other nodes (including the UE) via a network interface 1402. A controller 1403 controls the operation of the core network node 1400 in accordance with software stored in a memory 1404. For example, the controller 1403 may be realized by Central Processing Unit (CPU). Software may be pre-installed in the memory 1404 and/or may be downloaded via the telecommunication network or from a removable data storage device (RMD), for example. The software includes, among other things, an operating system 1405 and a communications control module 1406 having at least a transceiver control module 1407.

The communications control module 1406 (using its transceiver control sub-module) is responsible for handling (generating/sending/receiving) signalling between the core network node 1400 and other nodes, such as the UE, base station/(R)AN node (e.g. "gNB" or "eNB") (directly or indirectly). Such signalling may include, for example, appropriately formatted signaling messages relating to the procedures described herein, for example, NG AP message (i.e. a message by N2 reference point) to convey an NAS message from and to the UE, etc.

The AMF is the Access and Mobility Management Function. It is a network element in a mobile network that keeps a register of connected UEs and manages the mobility aspects of these UEs. The SMF is the Session Management Function. It is a network element in a mobile network and manages the sessions of UEs connected to the network.

The SEAF is the Security Anchor Function. It is a network element in a mobile network that serves as the security anchor. The SEAF holds the anchor key for each UE that is connected to the network.

The AUSF is the Authentication Server Function. It is a network element in a mobile network that manages the authentication of the UEs that connect to a network.

The UPF is the User Plane Function. It is a network element in a mobile network that terminates the user plane to the UE, or routes the user plane from a UE to another UPF.

The UDM is a Unified Data Management node. It is a network element in a mobile network that manages the data related to for example subscribers. Part of the UDM are a registry with subscriber identities and secret keys, also called the ARPF or the Authentication Center (AuC). The ARPF is the Authentication credentials Repository Function. It is a network element that stores and processes the subscriber credentials, such as the subscriber identity and the secret key.

The SIDF is the SUCI (Subscriber Concealed Identifier) Deconcealing Function. It is a network node that holds the home network private key and decrypts or deconceals the SUCI to obtain the SUPI (Subscriber Permanent Identity).

The network elements can be implemented as logical functions and can be hosted on a single network node. For example, the UDM, SIDF, and ARPF will commonly be one network node performing all the functions of the individual network elements.

The User Equipment (or "UE", "mobile station", "mobile device" or "wireless device") in the present disclosure is an entity connected to a network via a wireless interface.

It should be noted that the UE in this specification is not limited to a dedicated communication device, and can be applied to any device, having a communication function as a UE described in this specification, as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular internet of things (IoT) devices, IoT devices, and machinery.

It will be appreciated that the terms "UE" and "wireless device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE may support one or more IoT or MTC applications. Some examples of MTC applications are listed in the following table (source: 3GPP TS 22.368 V13.1.0, Annex B, the contents of which are incorporated herein by reference). This list is not exhaustive and is intended to be indicative of some examples of machine-type communication applications.

TABLE 19

Some examples of machine-type communication applications.

| Service Area | MTC applications |
| --- | --- |
| Security | Surveillance systems |
|  | Backup for landline |
|  | Control of physical access (e.g. to buildings) |
|  | Car/driver security |
| Tracking & | Fleet Management |
| Tracing | Order Management |
|  | Pay as you drive |
|  | Asset Tracking |

TABLE 19-continued

Some examples of machine-type communication applications.

| Service Area | MTC applications |
| --- | --- |
|  | Navigation |
|  | Traffic information |
|  | Road tolling |
|  | Road traffic optimisa lion/steering |
| Payment | Point of sales |
|  | Vending machines |
|  | Gaining machines |
| Health | Monitoring vital signs |
|  | Supporting the aged or handicapped |
|  | Web Access Telemedicine points |
|  | Remote diagnostics |
| Remote | Sensors |
| Maintenance/ | Lighting |
| Control | Pumps |
|  | Valves |
|  | Elevator control |
|  | Vending machine control |
|  | Vehicle diagnostics |
| Metering | Power |
|  | Gas |
|  | Water |
|  | Heating |
|  | Grid control |
|  | Industrial metering |
| Consumer | Digital photo frame |
| Devices | Digital camera |
|  | eBook |

Applications, services, and solutions may be an MVNO (Mobile Virtual Network Operator) service, an emergency radio communication system, a PBX (Private Branch eXchange) system, a PHS (Personal Handy-phone System)/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW (Network) selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary embodiments described in the present document. Needless to say, these technical ideas and embodiments are not limited to the above-described UE and various modifications can be made thereto.

As will be appreciated by one of skill in the art, the present disclosure may be embodied as a method, and system. Accordingly, the present disclosure may take the form of an entirely hardware embodiment, a software embodiment or an embodiment combining software and hardware aspects.

It will be understood that each block of the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. A general-purpose processor may be a microprocessor, but in the alternative, the processor may be any conventional processor, controller, microcontroller, or state machine. A processor may also be implemented as a combination of computing devices, e.g., a plurality of microprocessors, one or more microprocessors, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

The previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

For example, the whole or part of the above aspects can be described as, but not limited to, the following supplementary notes.

(Supplementary Note 1)
A terminal comprising:
a memory; and
a processor, comprising hardware, configured to:
perform a primary authentication between the terminal and a network in 5G for a third party service;
derive a security key, $K_{AUSF}$; and
derive an identifier for the security key from the security key.

(Supplementary Note 2)
The terminal according to Supplementary Note 1, wherein the primary authentication comprises 5G AKA or EAP-AKA'.

(Supplementary Note 3)
The terminal according to Supplementary Note 1 or 2, wherein the processor is further configured to:
transmit a message including the identifier for the security key.

(Supplementary Note 4)
The terminal according to any one of Supplementary Notes 1 to 3, wherein the third party service comprises AKMA service.

(Supplementary Note 5)
The terminal according to any one of Supplementary Notes 1 to 4, wherein the network in 5G comprises Authentication Server Function (AUSF).

(Supplementary Note 6)
The terminal according to any one of Supplementary Notes 1 to 5, wherein the security key is used for the third party service.

(Supplementary Note 7)
A method comprising:
performing a primary authentication between the terminal and a network in 5G for a third party service;
deriving a security key, $K_{AUSF}$; and
deriving an identifier for the security key from the security key.

(Supplementary Note 8)
The method according to Supplementary Note 7, wherein the primary authentication comprises 5G AKA or EAP-AKA'.

(Supplementary Note 9)
The method according to Supplementary Note 7 or 8 further comprising: transmitting a message including the identifier for the security key.

(Supplementary Note 10)
The method according to any one of Supplementary Notes 7 to 9, wherein the third party service comprises AKMA service.

(Supplementary Note 11)
The method according to any one of Supplementary Notes 7 to 10, wherein the network in 5G comprises Authentication Server Function (AUSF).

(Supplementary Note 12)
The method according to any one of Supplementary Notes 7 to 11, wherein the security key is used for the third party service.

(Supplementary Note 13)
A core network apparatus used in a network in 5G, the core network apparatus comprising:
a memory; and
a processor, comprising hardware, configured to:
perform a primary authentication between a terminal and the network for a third party service;
derive a security key, $K_{AUSF}$; and
derive an identifier for the security key from the security key.

(Supplementary Note 14)
The core network apparatus according to Supplementary Note 13, wherein the core network apparatus comprises Authentication Server Function (AUSF).

This application is based upon and claims the benefit of priority from Indian patent applications No. 201911008144, filed on Mar. 1, 2019, the disclosure of which is incorporated herein in its entirety by reference.

REFERENCE SIGNS LIST

1200 UE
1201, 1301, 1401 TRANSCEIVER CIRCUIT
1202, 1302 ANTENNA
1203 USER INTERFACE
1204, 1305, 1404 MEMORY
1205, 1304, 1403 CONTROLLER
1206, 1306, 1405 OPERATING SYSTEM
1207, 1307, 1406 COMMUNICATION CONTROL MODULE
1208, 1308, 1407 TRANSCEIVER CONTROL MODULE
1300 (R)AN NODE
1303, 1402 NETWORK INTERFACE
1400 CORE NETWORK NODE

What is claimed is:

1. A terminal comprising:
    a memory; and
    a processor, comprising hardware, configured to:
        perform a procedure of a primary authentication between the terminal and a network in 5G for an Authentication and Key Management for Applications (AKMA);
        generate a security key, Key of Authentication Server Function (AUSF) (KAUSF), during the procedure; and
        consider the primary authentication as successful and store the security key, KAUSF, upon receiving a Non Access Stratum (NAS) security mode command (SMC) message from the network in 5G.

2. The terminal according to claim 1, wherein the primary authentication comprises 5G AKA or EAP-AKA'.

3. The terminal according to claim 1, wherein the processor is further configured to:
    generate an identifier from the security key; and
    transmit a message including the identifier.

4. The terminal according to claim 1, wherein the network in 5G comprises AUSF.

5. The terminal according to claim 4, wherein the security key is used for the AKMA.

6. A method comprising:
    performing a procedure of a primary authentication between a terminal and a network in 5G for an Authentication and Key Management for Applications (AKMA);
    generating a security key, Key of Authentication Server Function (AUSF) (KAUSF), during the procedure; and
    considering the primary authentication as successful and storing the security key, KAUSF, upon receiving a Non Access Stratum (NAS) security mode command (SMC) message from the network in 5G.

7. The method according to claim 6, wherein the primary authentication comprises 5G AKA or EAP-AKA'.

8. The method according to claim 6 further comprising:
    generating an identifier from the security key; and
    transmitting a message including the identifier.

9. The method according to claim 6, wherein the network in 5G comprises AUSF.

10. The method according to claim 9, wherein the security key is used for the AKMA.

11. A non-transitory computer readable medium storing a program causing a computer to execute a process, the process comprising:
    performing a procedure of a primary authentication between a terminal and a network in 5G for an Authentication and Key Management for Applications (AKMA);
    generating a security key, Key of Authentication Server Function (AUSF) (KAUSF), during the procedure; and
    considering the primary authentication as successful and storing the security key, KAUSF, upon receiving a Non Access Stratum (NAS) security mode command (SMC) from the network in 5G.

12. The non-transitory computer readable medium according to claim 11, wherein the network in 5G comprises AUSF.

13. The non-transitory computer readable medium according to claim 11, wherein the primary authentication comprises 5G AKA or EAP-AKA'.

14. The non-transitory computer readable medium according to claim 11, wherein the process further comprises:
    generating an identifier from the security key; and
    transmitting a message including the identifier.

15. The non-transitory computer readable medium according to claim 12, wherein the security key is used for the AKMA.

* * * * *